United States Patent
Tokumoto et al.

(10) Patent No.: US 9,033,406 B2
(45) Date of Patent: May 19, 2015

(54) STRUCTURE FOR REAR PART OF VEHICLE BODY

(75) Inventors: Daisuke Tokumoto, Wako (JP);
Terukazu Ebisawa, Wako (JP); Masato Wakai, Wako (JP); Masaaki Tatsuwaki, Wako (JP); Manabu Nakayama, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 92 days.

(21) Appl. No.: 13/989,639

(22) PCT Filed: Nov. 22, 2011

(86) PCT No.: PCT/JP2011/076865
§ 371 (c)(1),
(2), (4) Date: May 24, 2013

(87) PCT Pub. No.: WO2012/073753
PCT Pub. Date: Jun. 7, 2012

(65) Prior Publication Data
US 2013/0241240 A1   Sep. 19, 2013

(30) Foreign Application Priority Data

Nov. 29, 2010   (JP) .................... 2010-265333
Nov. 29, 2010   (JP) .................... 2010-265372
Nov. 29, 2010   (JP) .................... 2010-265463

(51) Int. Cl.
*B62D 25/08*   (2006.01)

(52) U.S. Cl.
CPC .............. *B62D 25/08* (2013.01); *B62D 25/087* (2013.01)

(58) Field of Classification Search
CPC .............................. B62D 25/08; B62D 25/087
USPC .............. 296/193.08, 203.04, 146.6, 146.09, 296/204, 155, 146.9
See application file for complete search history.

(56) References Cited

U.S. PATENT DOCUMENTS

| 6,007,133 | A  | * | 12/1999 | Heim et al. ..................... 296/56 |
| 7,083,225 | B2 | * | 8/2006  | Yakata et al. ............. 296/203.04 |
| 7,226,114 | B2 | * | 6/2007  | Kusumoto .................... 296/155 |
| 2005/0073174 | A1 | * | 4/2005  | Yamaguchi et al. ...... 296/203.04 |
| 2007/0138837 | A1 | * | 6/2007  | Tomioka .................. 296/203.04 |
| 2009/0289475 | A1 | * | 11/2009 | Walter et al. ............. 296/203.01 |
| 2011/0156447 | A1 | * | 6/2011  | Matsuoka et al. ........ 296/203.04 |

FOREIGN PATENT DOCUMENTS

| DE | 102008061370 | 6/2009 |
| JP |     08-295265 | 11/1996 |

(Continued)

OTHER PUBLICATIONS

European Search Report dated Aug. 20, 2014, 7 pages.

*Primary Examiner* — Pinel Romain
(74) *Attorney, Agent, or Firm* — Rankin, Hill & Clark LLP

(57) ABSTRACT

A vehicle body includes: an opening that is formed in the rear surface; a rear panel assembly having a closed cross-sectional shape and being located at the lower edge of the opening and extending in the width direction of the vehicle; left and right rear wheel wells located in front of the rear panel assembly; and left and right gussets for panels, the gussets connecting the left and right rear wheel wells and the rear panel assembly. Each of the rear wheel wells forms a portion of each of the inner walls of the vehicle body side sections, and the rear wheel wells have support sections for supporting rear dampers for the left and right rear suspensions.

21 Claims, 21 Drawing Sheets

(56) References Cited

FOREIGN PATENT DOCUMENTS

| JP | 09-002333 | 1/1997 |
| JP | 09-066862 | 3/1997 |
| JP | 2000-016338 | 1/2000 |
| JP | 2005-199855 | 7/2005 |
| JP | 2007-296879 | 11/2007 |
| JP | 2008-284936 | 11/2008 |

* cited by examiner

STRUCTURE FOR REAR PART OF VEHICLE BODY

TECHNICAL FIELD

The present invention relates to a structure for a rear part of a vehicle body, i.e. a rear vehicle body structure, improved to increase rigidity of the vehicle body having an opening section in its rear-end panel.

BACKGROUND ART

Among the conventionally-known vehicles are vehicles of a type, such as a hatchback type, which opens and closes an opening section of a rear panel by means of a tailgate (see for example Patent Literatures 1 to 3). A closed sectional member extending in the vehicle width direction is provided on the lower edge of the opening section, and thus, the rear panel has a high rigidity. Further, left and right rear damper houses for supporting left and right rear suspension dampers are provided on a rear part of the vehicle body.

Particularly, in the vehicle body disclosed in Patent Literature 1, left and right rear damper houses disposed in the interior of the vehicle are jointed at their rear ends directly to the opposite ends of the closed sectional member. Thus, bending rigidity, in the vehicle width direction, of the left and right rear damper houses can be increased by the closed sectional member extending in the vehicle width direction.

In recent years, development has been under way of techniques for even further increasing an overall rigidity of the vehicle body. In order to increase an overall rigidity of a rear part of the vehicle body, it is preferable that a load having been transmitted from the left and right rear suspension dampers to the left and right rear damper houses, particularly a load in the vehicle width direction, be further transmitted to the closed sectional member as efficiently as possible. However, because the left and right rear damper houses each comprises only a house comprises only a side plate and a top plate provided on the upper end of the side plate, there is a limit in efficiently transmitting the load in the vehicle width direction from the left and right rear suspension dampers to the closed sectional member. Besides, because the left and right rear damper houses are disposed in the interior of the vehicle, the vehicle would have a reduced interior space. In order to increase the interior space of the vehicle, further improvement has to be made.

PRIOR ART LITERATURE

Patent Literature 1: Japanese Patent Application Laid-Open Publication No. 2000-016338
Patent Literature 2: Japanese Patent Application Laid-Open Publication No. 2007-296879
Patent Literature 3: Japanese Patent Application Laid-Open Publication No. H09-2333

SUMMARY OF INVENTION

Technical Problem

It is therefore an object to provide a technique which can even further increase the overall rigidity of the entire vehicle body by efficiently transmitting a load, having been transmitted from the left and right rear suspension dampers to the left and right rear damper houses, to another portion of the vehicle body.

Solution to Problem

According to claim 1 of the instant application, there is provided a rear vehicle body structure comprising: an opening section formed in a rear surface of a vehicle body; a rear panel assembly of a closed sectional shape disposed on and along a lower edge of the opening section and extending in a vehicle width direction; and left and right rear wheel houses disposed in front of the rear panel assembly and constituting parts of inner walls of left and right side sections of the vehicle body, the left and right rear wheel houses including support sections for supporting left and right rear suspension dampers, characterized in that the rear vehicle body structure further comprises left and right panel gussets interconnecting the rear panel assembly and the left and right rear wheel houses, and in that the left and right panel gussets extend from their respective one end portions, connected to the left and right rear wheel houses, toward the rear of the vehicle body while slanting toward a vehicle width center, the left and right panel gussets being joined at their respective other end portions to the rear panel assembly.

Preferably, as recited in claim 2, the rear vehicle body structure of the invention further comprises: left and right gutter assemblies each having a closed sectional shape, the left and right gutter assemblies being disposed on and along left and right side edges of the opening section and extending in an up-down direction of the vehicle body; and left and right gutter gussets interconnecting the left gutter assembly and the left rear wheel house and the right gutter assembly and the right rear wheel house, respectively.

Preferably, as recited in claim 3, the left and right gutter gussets extend from their respective one end portions, jointed to the left and right rear wheel houses, in an upward direction of the vehicle body in such a manner that their respective other end portions are joined to the gutter assemblies.

Preferably, as recited in claim 4, the left and right panel gussets are joined at their respective one end portions to end portions, closer to the vehicle width center, of the left and right gutter gussets.

Preferably, as recited in claim 5, the rear vehicle body structure according of the invention further comprises: left and right combination panels accommodating left and right rear combination lamps, respectively, disposed adjacent to a peripheral edge of the opening section; and left and right gusset's closed section parts provided on corner sections between the left and right rear houses and the rear panel assembly, respectively. The left and right gutter gussets are joined at their respective outer end portions in the vehicle width direction to the left and right rear wheel houses, the left and right gusset's closed section parts are each constructed in a closed sectional shape, as viewed in plan, with a left or right rear wall formed by the rear panel assembly and the left or right combination panel, an outer wall formed by the left or right rear wheel house and disposed on an outer side in the vehicle width direction, an inner wall formed by the left or right panel gusset and disposed on an inner side in the vehicle width direction, and a front wall formed by the left or right gutter gusset.

Preferably, as recited in claim 6, the rear panel assembly comprises a rear outer member disposed on an exterior side of the vehicle and extending in the vehicle width direction, and a rear inner member disposed on an interior side of the vehicle and extending in the vehicle width direction, the interior of the rear panel assembly, formed in a closed sectional shape with the rear outer member and the rear inner member, is partitioned in the vehicle with direction by a plurality of bulkheads, and positions where the other end portions of the left and right panel gussets are joined to the rear panel assembly are located at or near positions where the plurality of bulkheads are disposed relative to the rear panel assembly.

Preferably, as recited in claim 7, the left and right combination panels constitute parts of the left and right gutter assemblies, respectively.

Preferably, as recited in claim 8, the left and right combination panels each comprise a left or right inner combination member disposed on the peripheral edge of the opening section and a left or right side combination member disposed outwardly, in the vehicle width direction, of the left or right inner combination member, and the left and right inner combination members are each formed of a plate greater in thickness than a plate of which each of the left and right side combination members is formed.

Preferably, as recited in claim 9, the rear vehicle body structure of the invention further comprises left and right side panels disposed on left and right side edges, respectively, of the opening section and constituting side sections of the vehicle body, and left and right gutter stiffeners provided in the left and right side panels, respectively. The left and right side panels each comprise a left or right inner side panel disposed on the interior side of the vehicle, and a left or right outer side panel disposed on the exterior side of the vehicle, the left and right inner side panels each comprise a left or right inner side wall section extending in a front-rear direction of the vehicle body, and a left or right inner rear wall section bent from a rear end of the left or right inner side wall section toward the vehicle width center, the outer side panels each comprise a left or right outer side wall section extending in the front-rear direction while being spaced a predetermined distance outwardly, in the vehicle width direction, from the left or right inner side wall section, and a left or right outer rear wall section bent from the left or right outer side wall section to be joined to the left or right inner rear wall section, the left and right gutter stiffeners are each disposed in an interior space surrounded by the left or right inner side wall section and the left or right outer side wall section, and left and right gutter's closed section parts each having a closed sectional shape and extending in the up-down direction of the vehicle body are defined by the left gutter stiffer and the left inner side panel and by the right gutter stiffer and the right inner side panel, respectively.

Preferably, as recited in claim 10, the lower edge of the opening section is defined by the rear panel assembly, an upper edge of the opening section is defined by a rear roof rail extending in the vehicle width direction, the left and right side edges of the opening section are defined by the left and right gutter assemblies, the left and right gutter assemblies comprise the left and right inner side wall sections and the left and right gutter stiffeners. The left and right gutter stiffeners comprise: left and right lower gutter members extending from left and right lower corner sections between the rear panel assembly and the left and right gutter assemblies to the left and right inner side wall sections; and left and right upper gutter members extending from left and right upper corner sections between the rear roof rail and the left and right gutter assemblies to the left and right inner side wall sections.

Preferably, as recited in claim 11, the rear panel assembly is constructed in a closed sectional shape with a rear outer member disposed on the exterior side of the vehicle and extending in the vehicle width direction and a rear inner member disposed on an interior side of the vehicle and extending in the vehicle width direction, the rear inner member has left and right bulge sections bulging toward the interior of the vehicle, the rear outer member has a body section joined to vehicle-exterior-side surfaces of the left and right bulge sections, the left and right lower corner sections are each constructed in a closed sectional shape with a left or right inner corner member disposed on the interior side of the vehicle and having the left or right lower gutter member joined thereto and a left or right outer corner member disposed on the exterior side of the vehicle and joined to the left or right inner corner member, and the left and right outer corner members are disposed on portions of the left and right lower corner sections on the exterior side of the vehicle, the left and right outer corner members being joined to the body section and to corresponding ones of the left and right lower gutter members.

Preferably, as recited in claim 12, the rear outer member includes a rear outer panel constituting a vehicle-width-intermediate region, the rear inner member includes a rear inner panel constituting a vehicle-width-intermediate region. The left and right inner corner members each comprise: a left or right rear panel extension extending outwardly, in the vehicle width direction, from the rear inner panel; and a left or right gutter extension joined at an upper end portion thereof to a vehicle-interior-side surface of the left or right lower gutter member and thereby constructing a closed section in conjunction with the left or right lower gutter member, and the left and right gutter extensions are joined at their respective lower end portions to the left and right rear panel extensions, respectively.

Preferably, as recited in claim 13, the left and right rear panel extensions are each formed of a plate greater in thickness than a plate of which each of the left and right gutter extensions is formed.

Preferably, as recited in claim 14, the left and right outer corner members each comprise a left or right combination panel disposed near the left or right lower corner section for accommodating a left or right rear combination lamp, and the left and right outer corner members are joined to the body section and to corresponding ones of the left and right lower gutter members.

Preferably, as recited in claim 15, the left and right combination panels each comprise a left or right inner combination member disposed on the peripheral edge of the opening section and a left or right side combination member disposed outwardly, in the vehicle width direction, of the left or right inner combination member, and the left and right inner combination members are each formed of a plate greater in thickness than a plate of which each of the left and right side combination members is formed.

Preferably, as recited in claim 16, the left and right upper gutter members are each formed of a plate greater in thickness than a plate of which each of the left and right lower gutter members is formed.

Preferably, as recited in claim 17, the rear panel assembly is formed in a closed sectional shape with a rear outer member disposed on the exterior side of the vehicle and extending in the vehicle width direction and a rear inner member disposed on the interior side of the vehicle and extending in the vehicle width direction, the rear outer member includes a rear outer panel constituting a vehicle-width-intermediate region, the rear inner member includes a rear inner panel constituting a vehicle-width-intermediate region, the rear outer panel comprises a body section opposed to the rear surface of the rear inner panel, left and right bent sections bent from opposite end portions, in the vehicle width direction of the body section, toward the front of the vehicle body, and a plurality of bulkheads extending from the left and right bent sections toward the rear inner panel, a front end portion of each of the plurality of bulkheads is disposed outwardly, in the vehicle width direction, of the left and right bent sections, and the interior of the rear panel assembly is partitioned in the vehicle with direction by the plurality of bulkheads.

Preferably, as recited in claim 18, each of the plurality of bulkheads has a front flange extending from the front end portion outwardly in the vehicle width direction and joined to the rear inner member.

Preferably, as recited in claim 19, the rear inner panel has a polygonal section part formed in a channel configuration of a polygonal sectional shape hollowed toward the front of the vehicle body and extending in the vehicle width direction, the polygonal section part is closed with the body section and includes a front wall remotest from the body section in a forward direction of the vehicle body, an upper wall extending from an upper end of the front wall toward the rear of the vehicle body and a lower wall extending from the lower end of the front wall toward the rear of the vehicle body, and each of the plurality of bulkheads has: an upper end section formed to extend along the upper wall of the polygonal section part; an upper flange extending outwardly, in the vehicle width direction, from the upper end section and joined to the lower wall of the polygonal section part; a lower end section formed to extend along the lower wall of the polygonal section part; and a lower flange extending outwardly, in the vehicle width direction, from the lower end section and joined to the lower wall of the polygonal section part.

Preferably, as recited in claim 20, a body-side upper flange extending in the vehicle width direction is formed on the upper end of the body section, and an upper recess is formed between each of opposite ends, in the vehicle width direction, of the body-side upper flange and the upper flange of a corresponding one of the plurality of bulkheads.

Preferably, as recited in claim 21, a body-side lower flange extending in the vehicle width direction is formed on the lower end of the body section, and a lower recess is formed between each of opposite ends, in the vehicle width direction, of the body-side lower flange and the lower flange of a corresponding one of the plurality of bulkheads.

Further, preferably, as recited in claim 22, the rear inner panel includes a vertical plate-shaped extended wall section extending from the lower end of the polygonal section part along the rear surface of the vehicle body.

Advantageous Effects of Invention

In the invention recited in claim 1, the left and right panel gussets extend from their respective one end portions, connected to the left and right rear wheel houses, toward the rear of the vehicle body while slanting toward the vehicle width center, so that the left and right panel gussets are joined at their respective other end portions to the rear panel assembly. In this manner, the left and right panel gussets can efficiently and smoothly transmit a load (damper load), having been transmitted from the left and right rear suspension dampers to the left and right support sections, from the left and right rear wheel houses to the rear panel assembly for dispersion via the rear panel assembly. Thus, the present invention can not only increase bending rigidity, in the vehicle width direction, of the left and right rear wheel houses by means of the rear panel assembly extending in the vehicle width direction, but also increase rigidity of the left and right damper support sections. As a consequence, the present invention can even further increase the overall rigidity of the entire vehicle body. In addition, external force (mainly, external force in the vehicle width direction) having acted on the rear panel assembly from outside the vehicle body can be efficiently transmitted, by means of the left and right panel gusset, to the left and right rear wheel houses for dispersion via the left and right rear wheel houses. As a consequence, the overall rigidity of the entire vehicle body can be even further increased. Further, the left and right panel gussets can be disposed at corners between the left and right wheel houses constituting parts of the inner side walls of the vehicle body and the rear panel assembly extending in the vehicle width direction. Thus, the present invention can secure a maximum space in the interior of the vehicle.

Further, in the invention recited in claim 2, the left and right gutter gussets interconnecting the left gutter assembly and the left rear wheel house and the right gutter assembly and the right rear wheel house, respectively. In this way, the left and right gutter gussets can efficiently and smoothly transmit a vertical load (damper load), having been transmitted from the left and right rear suspension dampers to the left and right damper support sections, from the left and right rear wheel houses to the left and right gutter assemblies for dispersion via the left and right gutter assemblies. Thus, the present invention can increase the rigidity of the left and right rear wheel houses and the left and right damper support sections. As a result, the present invention can even further increase the overall rigidity of the vehicle body. In addition, external force (mainly, vertical external force) having acted on the left and right gutter assemblies from outside the vehicle body can be efficiently and smoothly transmitted, by means of the left and right gutter assemblies, to the left and right rear wheel houses for dispersion via the left and right rear wheel houses. Because the rigidity of the left and right gutter assemblies can be increased in this way, the rigidity of the left and right side edges of the opening section can be increased. As a result, the present invention can even further increase the overall rigidity of the vehicle body.

Further, in the invention recited in claim 3, the left and right gutter gussets extend from their respective one end portions, jointed to the left and right rear wheel houses, in the upward direction of the vehicle body in such a manner that their respective other end portions are joined to the gutter assemblies. Thus, the present invention can smoothly transmit a load to the gutter assemblies (gutter's closed section parts) over the length thereof. In this way, the present invention can achieve an enhanced load transmitting efficiency.

Further, in the invention recited in claim 4, the left and right panel gussets are joined at their respective one end portions to end portions, closer to the vehicle width center, of the left and right gutter gussets. Thus, the present invention can even further increase rigidity of the vehicle body at and around the left and right support sections. Further, irrespective of a direction of a damper load acting on the left and rear suspension dampers, the present invention can transmit the damper load to the rear panel assemblies and gutter assemblies. In this way, the present invention can achieve an enhanced load transmitting efficiency.

Further, in the invention recited in claim 5, the left and right combination panels accommodate left and right rear combination lamps, respectively, disposed adjacent to the peripheral edge of the opening section, the left and right gutter gussets are joined at their respective outer end portions in the vehicle width direction to the left and right rear wheel houses, and the left and right gusset's closed section parts are constructed in corner sections between the rear panel assembly and the left and right rear wheel houses. Thus, the present invention can increase the rigidity (particularly, torsional rigidity) of the vehicle body Further, in the invention recited in claim 6, the interior of the rear panel assembly, formed in a closed sectional shape with the vehicle-exterior-side rear outer member and the vehicle-interior-side rear inner member and extending in the vehicle width direction, is partitioned in the vehicle with direction by the plurality of bulkheads. Because the other end portions of the left and right panel gussets are joined to portions of the rear panel assembly where the plurality of bulkheads are disposed or to portions near those portions, the present invention can transmit a load from the left and right panel gussets to not only the rear inner member but also the entire rear panel assembly, and thereby achieve an enhanced load transmitting efficiency.

Further, in the invention recited in claim 7, the left and right combination panels constitute parts of the left and right gutter assemblies, respectively. Thus, the present invention can reduce the number of necessary panels constituting the gutter assemblies and thus can achieve a reduced number of necessary component parts of the vehicle body.

Further, in the invention recited in claim 8, the left and right combination panels each comprise the left or right inner combination member disposed on the peripheral edge of the opening section and the left or right side combination member disposed outwardly, in the vehicle width direction, of the left or right inner combination member, and the left and right inner combination members are each formed of a plate greater in thickness than a plate of which each of the left and right side combination members is formed. Thus, the present invention can achieve an enhanced load transmitting performance. As a result, the present invention can simultaneously achieve enhancement of the load transmitting performance and reduction of the overall weight of the vehicle body.

Further, according to th invention recited in claim 9, the rear vehicle body structure further comprises the left and right side panels disposed on the left and right side edges, respectively, of the opening section and constituting side sections of the vehicle body, and the left and right gutter stiffeners provided in the left and right side panels, respectively. The left and right side panels each comprise the left or right inner side panel disposed on the interior side of the vehicle, and the left or right outer side panel disposed on the exterior side of the vehicle. The left and right inner side panels each comprise the left or right inner side wall section extending in the front-rear direction of the vehicle body, and the left or right inner rear wall section bent from the rear end of the left or right inner side wall section toward the vehicle width center. Thus, the inner walls of the side sections of the vehicle body do not bulge to the interior of the vehicle, so that a sufficient space can be secured in the interior of the vehicle. Further, the left and outer side panels each comprise the left or right outer side wall section extending in the front-rear direction while being spaced a predetermined distance outwardly, in the vehicle width direction, from the left or right inner side wall section, and the left or right outer rear wall section bent from the left or right outer side wall section to be joined to the left or right inner rear wall section. Thus, the present invention can reduce the number of necessary component parts as compared to the case where a framework is constructed by joining together separate component parts. Further, because the gutter stiffener bulges from the inner side panel outwardly in the vehicle width direction and thereby constitutes the closed section extending in the vertical or up-down direction between the inner side wall section and the outer side wall section, the present invention can achieve an increased rigidity of the opening section.

Further, in the invention recited in claim 10, the left and right gutter stiffeners comprise: the left and right lower gutter members extending from the left and right lower corner sections between the rear panel assembly and the left and right gutter assemblies to the left and right inner side wall sections; and the left and right upper gutter members extending from the left and right upper corner sections between the rear roof rail and the left and right gutter assemblies to the left and right inner side wall sections. Thus, with the left and right gutter stiffeners, a closed section structure can be provided continuously from the left and right upper corner sections through to the left and right lower corner sections. Namely, in the left and right gutter stiffeners, the left and right upper gutter members are separated from the left and right lower gutter members. Thus, even in a case where the left and right gutter stiffeners are formed in a shape corresponding to shape of the left and right upper corner sections and the left and right lower corner section, for example, the present invention allows the left and right gutter stiffeners to be formed with ease; namely, the present invention can maintain desired formability of the left and right gutter stiffeners.

Further, in the invention recited in claim 11, the rear panel assembly is constructed in a closed sectional shape, extending in the vehicle width direction, with the rear inner member having the bulge sections bulging toward the interior of the vehicle and the rear outer member having the body section joined to the respective vehicle-exterior-side surfaces of the bulge sections. The left and right lower corner sections are each constructed in a closed sectional shape with the left or right inner corner member disposed on the interior side of the vehicle and having the left or right lower gutter member joined thereto and the left or right outer corner member disposed on the exterior side of the vehicle and joined to the left or right inner corner member. The left and right outer corner members are disposed on the exterior side of the vehicle and joined to the body section and to the corresponding ones of the left and right lower gutter members. Because the left and right lower corner sections are each constructed in a closed sectional shape with the left or right inner corner member and the left or right outer corner member, a closed section structure can be provided continuously from the lower edge of the opening section through to the left and right side edges of the opening section. Thus, even in the case where the closed sections of the left and right side edges are formed outwardly of the inner side panels as noted above, the present invention can achieve an increased rigidity of the vehicle body.

Further, in the invention recited in claim 12, the left and right corner members are constructed as a divided structure comprising the left and right gutter extensions and the left and right rear panel extensions. The left and right gutter extensions are joined at their respective lower end portions to the left and right rear panel extensions, respectively. The closed sections constituted by lower portions of the left and right lower gutter members and the left and right gutter extensions can be provided continuously with the closed sections constituted by the left and right inner side panels and upper portions of the left and right lower gutter members. Thus, even where sets of the left and right inner side panels and the left and right gutter stiffeners, joined to each other in advance, are assembled sequentially from the outside in the vehicle width direction (i.e., vehicle width outside) toward the vehicle width center, for example, the present invention can achieve an enhanced productivity. Besides, because the closed section structure extends continuously from the lower edge through to the left and right side edges of the opening section, the present invention can secure a sufficient rigidity of the opening section. Furthermore, because the left and right gutter extensions and the left and right rear panel extensions are separated from each other, the present invention can achieve an enhanced productivity of the left and right inner corner members.

Further, in the invention recited in claim 13, the left and right rear panel extensions are each formed of a plate greater in thickness than a plate of which each of the left and right gutter extensions is formed. Thus, the rigidity of the left and right lower corner sections can be increased. Moreover, because the left and right gutter extensions each form a closed section in conjunction with the corresponding, i.e. left or right, lower gutter member, the rigidity of the left and right gutter extensions need not be so great as the rigidity of the left and right rear panel extensions. Thus, the left and right gutter extensions are each formed of a relatively thin plate, so that the overall weight of the vehicle body can be reduced.

Further, in the invention recited in claim 14, the left and right outer corner members each comprise the left or right combination panel disposed near the left or right lower corner section for accommodating the left or right rear combination lamp. Namely, the left and right combination panels function also as the left and right outer corner members, and thus, there is no need to add other members. Thus, the present invention can reduce the number of necessary component parts. Moreover, because the left and right combination panels are joined to the body section and corresponding ones of the left and right lower gutter members, the rigidity of the left and right lower corner sections can be increased.

Further, in the invention recited in claim 15, the left and right combination panels each comprise the left or right inner combination member disposed on the peripheral edge of the opening section and the left or right side combination member disposed outwardly, in the vehicle width direction, of the left or right inner combination member. Further, the left and right inner combination members are each formed of a plate greater in thickness than a plate of which each of the left and right side combination members is formed, the present invention can achieve an enhanced load transmitting performance. Further, with each of the left and right side combination members formed of a thin plate, the present invention can achieve reduction of the overall weight of the vehicle body.

Further, in the invention recited in claim 16, the left and right upper gutter members are each formed of a plate greater in thickness than a plate of which each of the left and right lower gutter members is formed. Thus, a sufficient rigidity of the opening section can be secured. Further, the left and right lower gutter members are reinforced with the left and right combination panels and thus can be formed of a thin plate, with the result that the overall weight of the vehicle body can be reduced.

Further, in the invention recited in claim 17, the plurality of bulkheads are integrated with the left and right rear outer panels. Thus, the present invention can achieve reduction in the number of necessary component parts and costs. Because the respective rear ends of the plurality of bulkheads are formed integrally with the left and right rear outer panels, they need not be joined to any other component parts. Thus, there is no need to form insertion holes for insertion of a spot welding gun or joining flanges. In this way, the present invention can not only simplify the shape of the left and right rear outer panels but also improve formability of the left and right rear outer panels. Furthermore, because the front end portions of the plurality of bulkheads are disposed outwardly, in the vehicle width direction, of the bent sections, the bent sections can be formed in an obtuse angle when the left and right rear outer panel are press-formed; thus, the formability of the bent sections can be enhanced.

Further, in the invention recited in claim 18, each of the plurality of bulkheads has the front flange extending from the front end portion outwardly in the vehicle width direction and joined to the left or right rear inner member. Thus, the present invention can achieve an increased rigidity of the closed section parts constituted by the left and right rear outer members and rear inner members. For example, if the front flange is oriented outwardly in the vehicle width direction, it is possible to even further increase the formability at the time of press forming of the rear outer panels.

Further, in the invention recited in claim 19, the rear inner panel has the polygonal section part including the front wall opposed to the body section and an opening portion, opening toward the rear of the vehicle body, defined by the upper and lower walls bent rearwardly from the upper and lower ends, respectively, of the front wall. Thus, each of the plurality of bulkheads has: the upper end section formed to extend along the upper wall of the polygonal section part; the lower end section formed to extend along the lower wall of the polygonal section part; the upper flange extending outwardly, in the vehicle width direction, from the upper end section and joined to the upper wall of the polygonal section part; and the lower flange extending outwardly, in the vehicle width direction, from the lower end section and joined to the lower wall of the polygonal section part. Thus, the rigidity of the closed section can be increased. For example, if the upper and lower flanges are oriented outwardly in the vehicle width direction, it is possible to even further increase the formability at the time of press forming of the rear outer panels.

Further, in the invention recited in claim 20, the body-side upper flange extending in the vehicle width direction is formed on the upper end of the body section, and the upper recess is formed between the upper flange of each of the bulkheads and the body-side upper flange by recessing the upper flange and the body-side upper flange. Generally, if the upper flange should extend continuously with the body-side upper flange, a deep drawing process would be required for forming a region where the upper flange and the body-side upper flange extend continuously with each other. Thus, the present invention is constructed to enhance the formability of the rear outer panel by recessing a region between the upper flange of each of the bulkheads and the body-side flange.

Further, in the invention recited in claim 21, the body-side lower flange extending in the vehicle width direction is formed on the lower end of the body section, and the lower recess is formed between the lower flange of each of the bulkheads and the body-side upper flange by recessing the upper flange and the body-side upper flange. Generally, if the lower flange should extend continuously with the body-side upper flange, a deep drawing process would be required for forming a region where the lower flange and the body-side upper flange extend continuously with each other. Thus, the present invention is constructed to enhance the formability of the rear outer panel by recessing a region between the upper flange of each of the bulkheads and the body-side flange.

Further, in the invention recited in claim 22, the rear inner panel includes the vertical plate-shaped extended wall section extending from the lower end of the polygonal section part along the rear surface of the vehicle body. Thus, even in a case where the polygonal section part is located higher than the floor panel in the interior of the vehicle, the floor panel and the rear panel assembly can be interconnected by the extended wall section. Because the rear inner panel includes the vertical plate-shaped extended wall section as noted above, the rear outer panel need not include such an extended wall section. The rear outer panel has a complicated shape with the plurality of bulkheads integrated therewith. However, because the rear outer panel need not include an extended wall section, the shape of the rear outer panel is not complicated any more. Thus, the present invention can achieve an enhanced formability of the rear outer panel. In addition, when the rear outer panel is cut from a sheet material or blank, an amount of the remaining material can be minimized. Thus, the present invention can significantly improve the yield rate.

DESCRIPTION OF EMBODIMENTS

Now, description will be made as to embodiments of the present invention with reference to the accompanying drawings.

Embodiments

Figure 1:
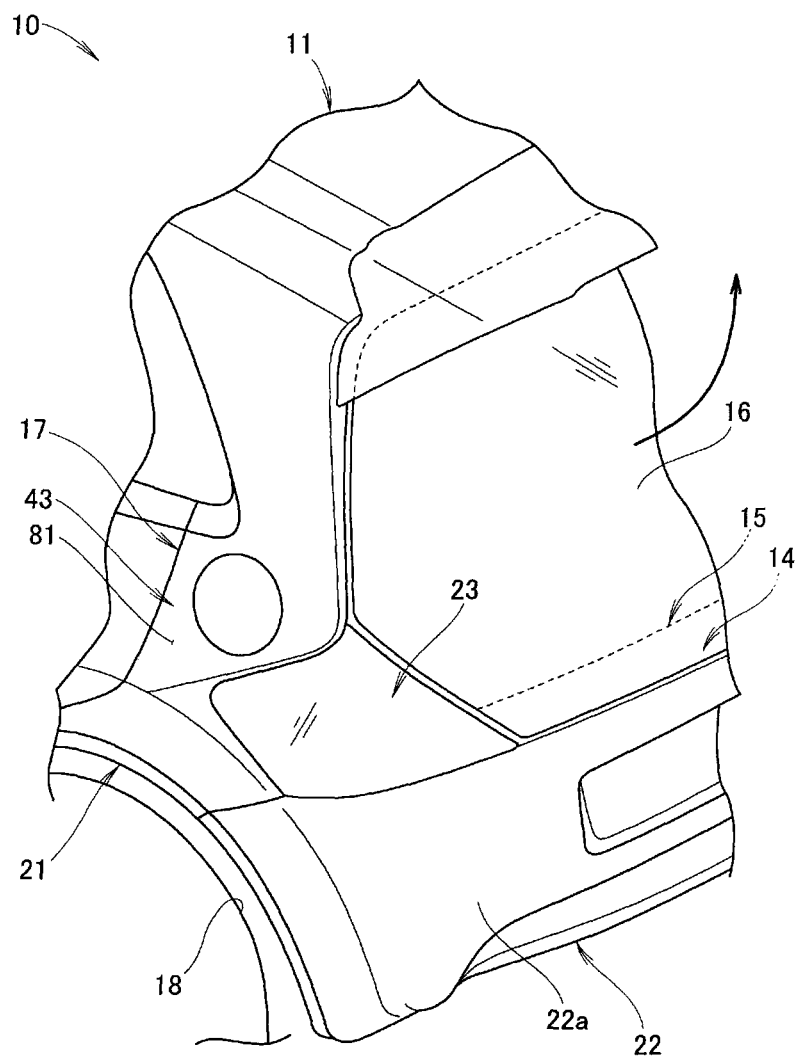
FIG. 1 is a left rear perspective view showing a rear part of a vehicle body employing an embodiment of the present invention.

The following describe an embodiment of a rear vehicle body structure of the present invention. As shown in FIG. 1, a vehicle 10 employing the embodiment of a rear vehicle body structure of the present invention is a so-called hatchback vehicle, which includes a tailgate 16 on the rear surface 14 (rear panel 14) of a vehicle body 11, and in which left and right rear wheels 18 are disposed near the rear end of the vehicle body 11.

The vehicle body 11 is of a monocoque type and constructed in horizontal left-right symmetry. A rear part of the vehicle body 11 includes: the rear panel 14 constituting the rear surface of the vehicle body 11; left and right side panels 17 constituting the left and right side surfaces of the vehicle body 11; left and right rear wheel houses 21 provided on rear lower portions of the left and right side panels 17; and a rear bumper face 22 provided underneath the rear panel 14.

An opening section 15 is formed in an upper portion of the rear panel 14, and the opening section 15 is covered, from outside the vehicle body, with the openable/closable tailgate 16. The tailgate 16 comprises, for example, a glass plate. Left and right rear combination lamps 23 are provided to the left and right of the rear panel 14. The left and right rear combination lamps 23 are capable of displaying a braking state and traveling direction of the vehicle 10.

As shown in FIGS. 2 to 6, the rear panel 14 includes a rear panel assembly 26, left and right gutter assemblies 41, and a rear roof rail 42. As further shown in FIGS. 2 to 6, the opening section 15 is formed in a rectangular shape by being surrounded by the rear panel assembly 26, left and right gutter assemblies 41 and rear roof rail 42. Thus, the opening section 15 of a rectangular shape is formed in the rear surface 14 (rear panel 14) of the vehicle body 11.

Namely, the upper edge 15a of the opening section 15 is defined by the rear roof rail 42 extending in the vehicle width direction, and the lower edge 15b of the opening section 15 is defined by the rear panel assembly 26. Further, the left and right side edges 15c of the opening section 15 are defined by the left and right gutter assemblies 41. The following paragraphs describe the aforementioned rear panel assembly 26, left and right gutter assemblies 41 and rear roof rail 42.

The left and right gutter assemblies 41 are closed sectional members that are disposed on and along the left and right side edges 15c of the opening section 15 and extend in a vertical, or up-down, direction of the vehicle body. Namely, the left and right gutter assemblies 41 constitute left and right closed section parts 39 extending in the up-down direction of the vehicle body (see also FIG. 11).

The rear roof rail 42 is disposed on and along the upper edge 15a of the opening section 15 and extends in the vehicle width direction. The rear roof rail 42 extends between the respective upper ends of the left and right gutter assemblies 41 to be joined at its opposite ends to the respective upper ends of the left and right gutter assemblies 41 via left and right upper corner sections 31.

The left and right upper corner sections 31 are disposed at left and right upper corners, respectively, of the opening section 15. Further, left and right lower corner sections 32 are disposed at left and right lower corners, respectively, of the opening section 15. The rear panel assembly 26 is disposed on and along the lower edge 15b of the opening section 15 and extends in the vehicle width direction. The rear panel assembly 26 extends between the respective lower ends of the left and right gutter assemblies 41 to be joined at its opposite ends to the respective lower ends of the left and right gutter assemblies 41 via the left and right lower corner sections 32.

Figure 3:
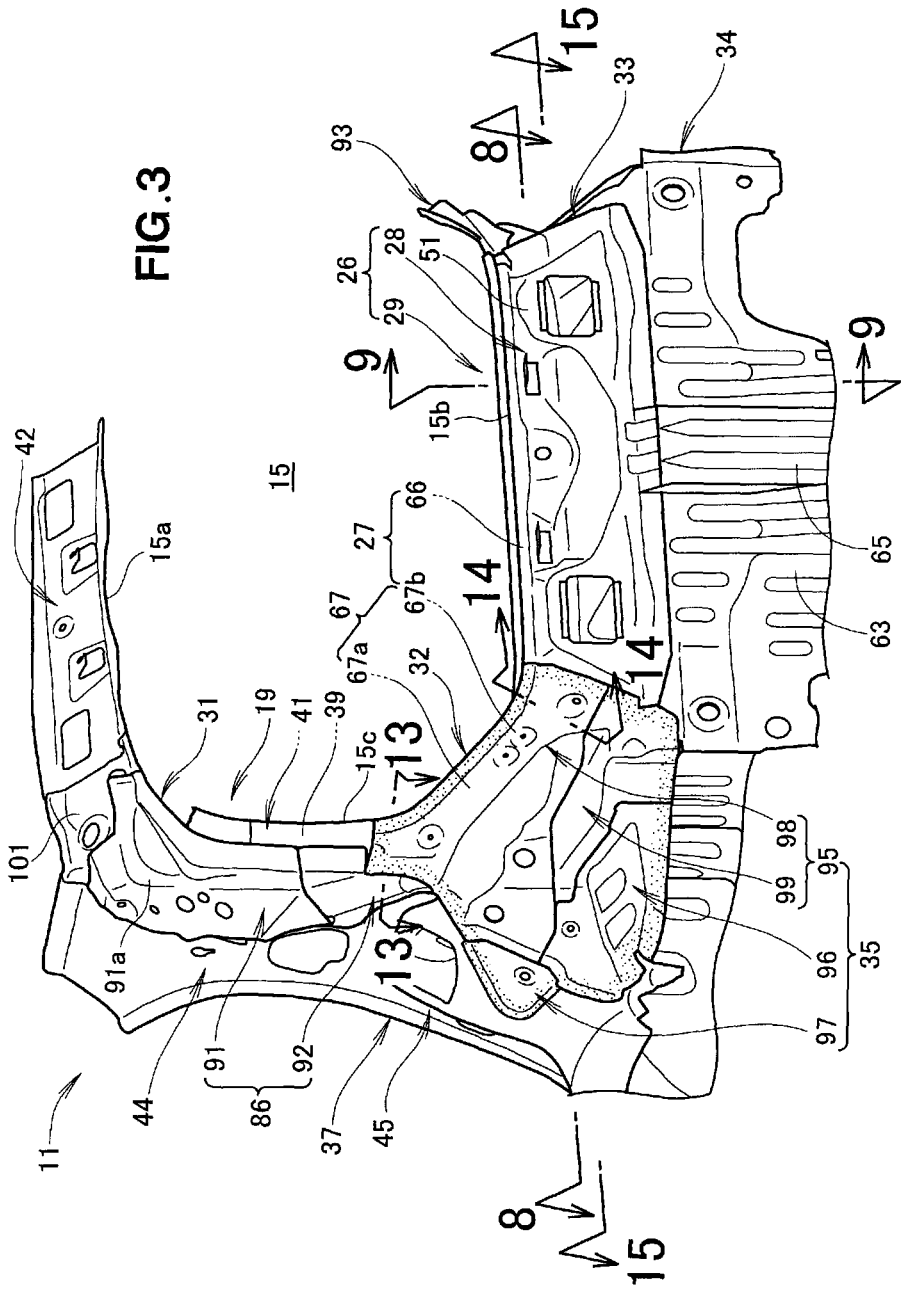
FIG. 3 is a perspective view showing the rear part of the vehicle body of FIG. 2 with an outer side panel removed therefrom.
Figure 8:
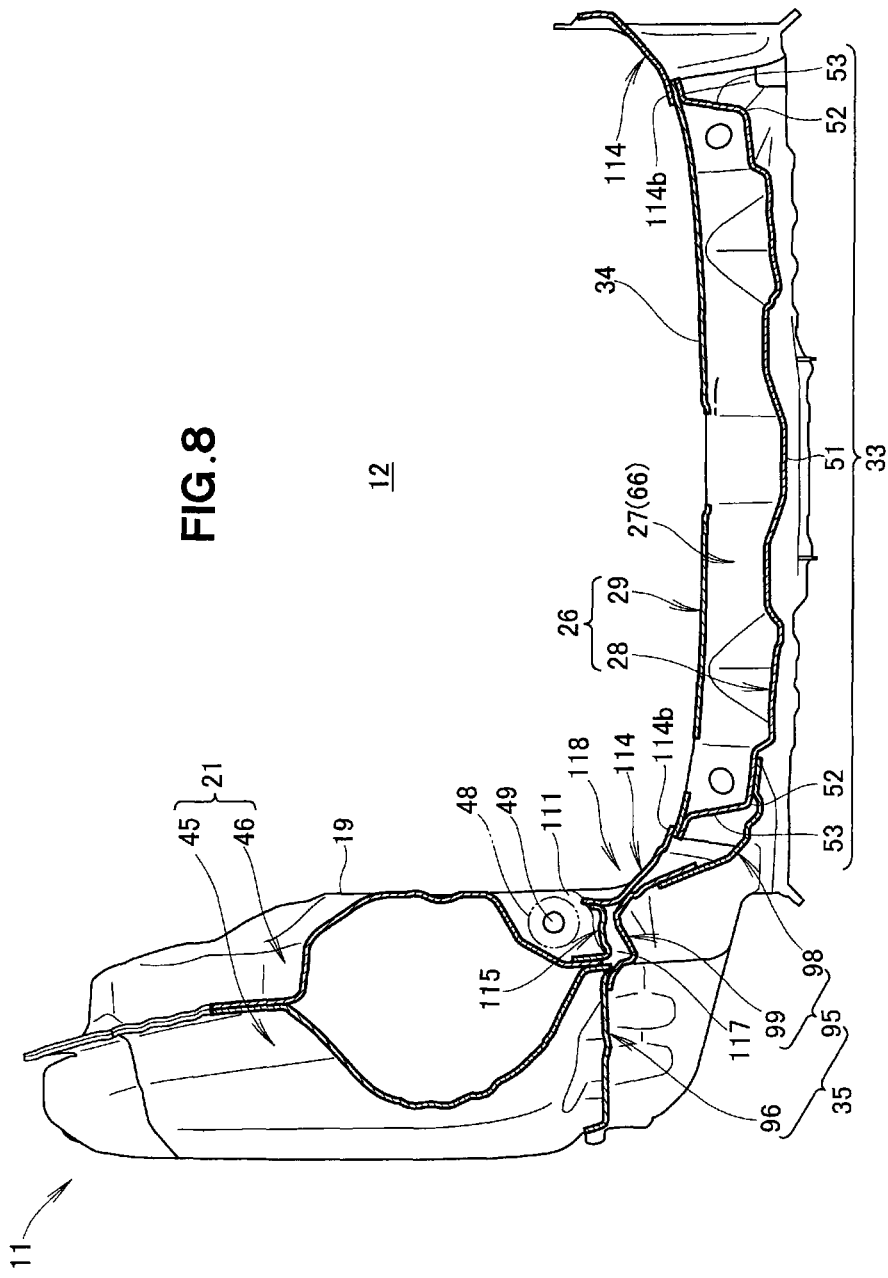
FIG. 8 is a sectional view taken along line 8-8 of FIG. 3.

As shown in FIGS. 3 and 8, the rear panel assembly 26 comprises a rear outer member 28 disposed on an exterior side of the vehicle and extending in the vehicle width direction, and a rear inner member 29 disposed on an interior side of the vehicle (namely, an side adjacent to a passenger compartment shown in FIG. 8) and extending in the vehicle width direction. Namely, the rear outer member 28 and the rear inner member 29 together constitute a hollow, closed section part 27 extending in the vehicle width direction. The closed section part 27 is disposed on and along the lower edge 15b of the opening section 15.

The rear outer member 28 includes a rear outer panel 33 located in a vehicle-width-intermediate region, and left and right inner upper combination members 98 located at the left and right ends of the rear outer panel 33. The rear outer panel 33 is a member constituting an intermediate region in the vehicle width direction (i.e., vehicle-width-intermediate region) of the rear outer member 28. The left and right inner upper combination members 98 are parts of left and right outer corner members 35 located at the left and right ends of the rear outer panel 33. The left and right outer corner members 35 are members constituting the left and right lower corner sections 32 of the opening section 15.

Figure 4:
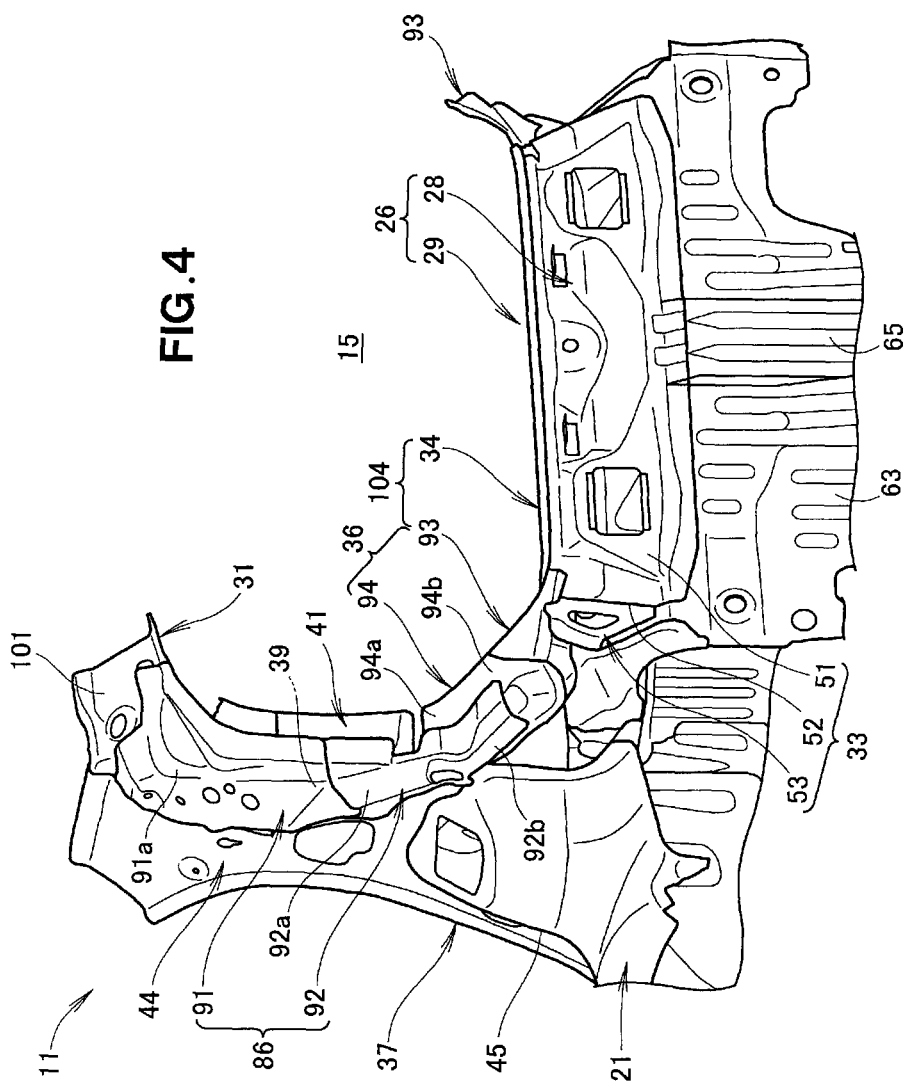
FIG. 4 is a perspective view showing the rear part of the vehicle body of FIG. 3 with a combination panel removed therefrom.
Figure 5:
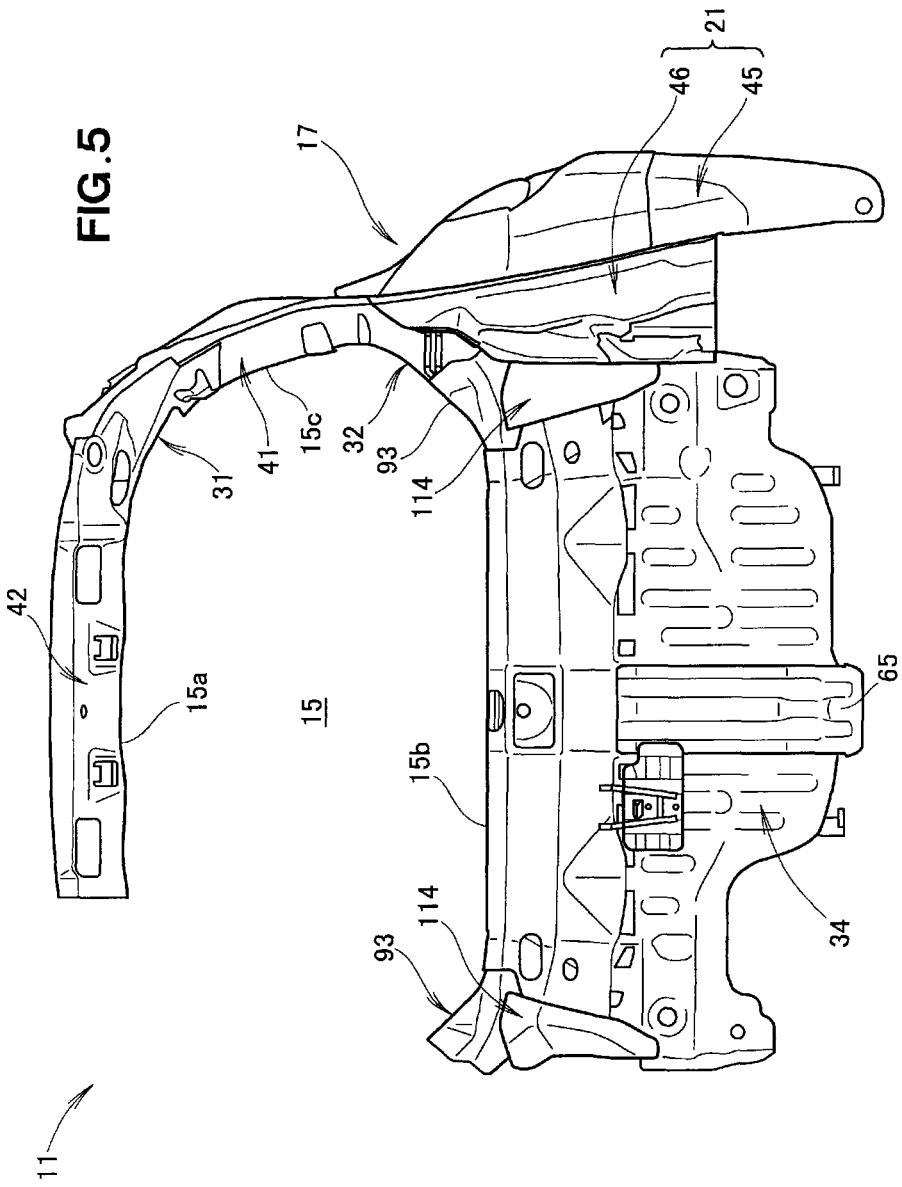
FIG. 5 is a rear view of the rear part of the vehicle body shown in FIG. 4.

As shown in FIGS. 3, 4 and 8, the rear inner member 29 includes: a rear inner panel 34; lower portions 92a of left and right lower gutter members 92; left and right rear panel extensions 93; and left and right gutter extensions 94. The rear inner panel 34 is a member constituting an intermediate region in the vehicle width direction (i.e., vehicle-width-intermediate region) of the rear inner member 29. The left and right rear panel extensions 93 are members constituting the left and right lower corner sections 32 (see FIG. 3) of the opening section 15.

Figure 2:
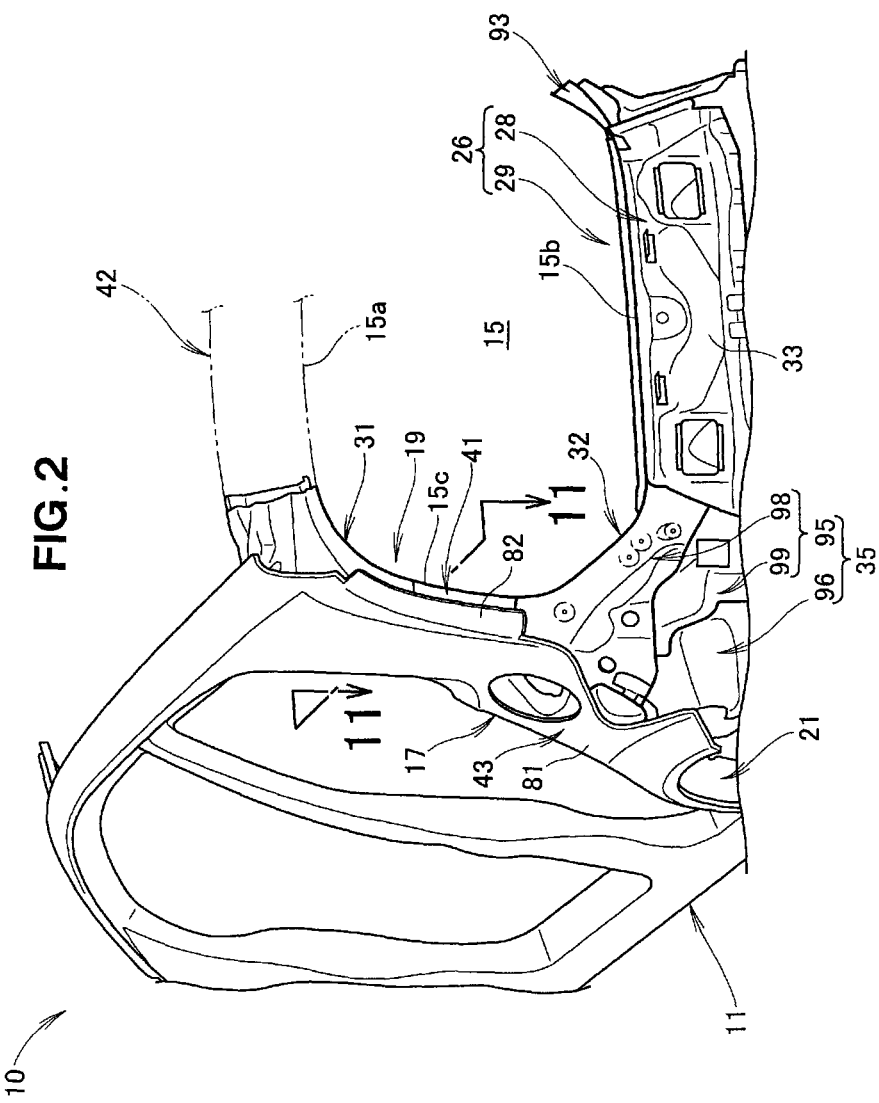
FIG. 2 is a perspective view showing the rear part of the vehicle body of FIG. 1 with a rear bumper face and a rear combination lamp removed therefrom.
Figure 11:
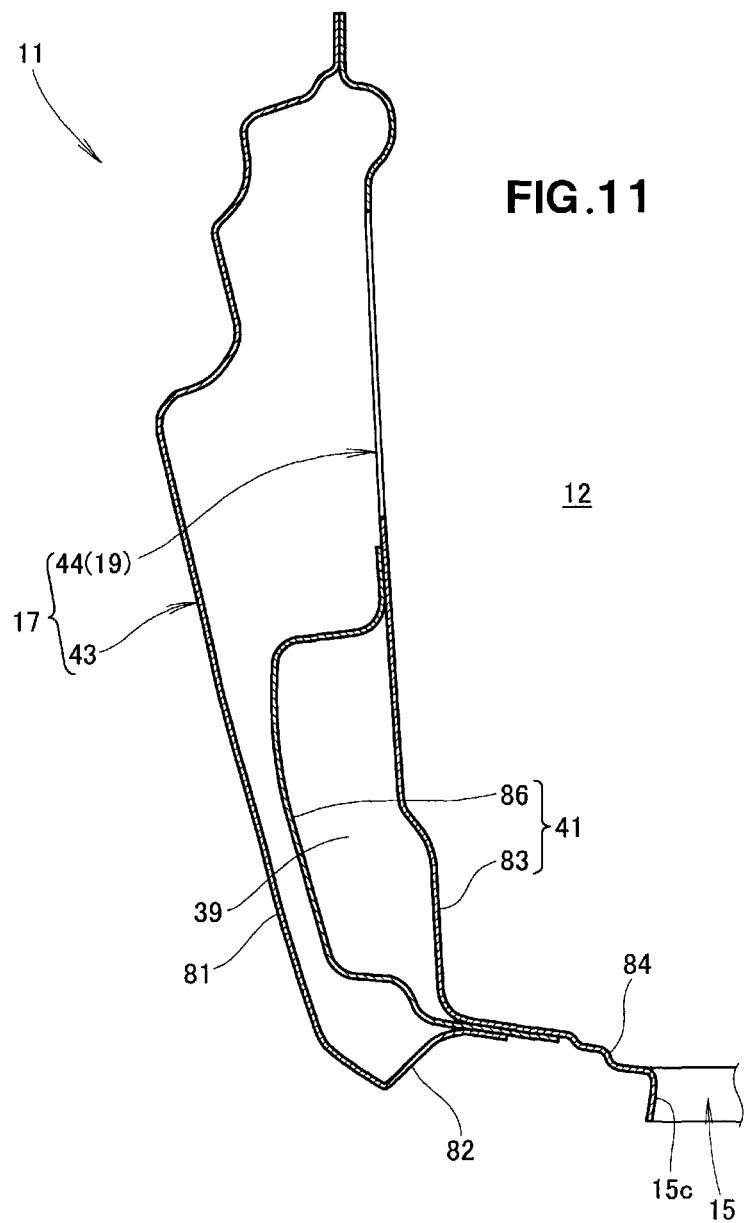
FIG. 11 is a sectional view taken along line 11-11 of FIG. 2.

Further, as shown in FIGS. 2, 3 and 11, the left and right gutter assemblies 41 include left and right inner side wall sections 83 located closer to the interior of the vehicle, and left and right gutter stiffeners 86 located closer to the exterior of the vehicle, and the left and right inner side wall sections 83 and the left and right gutter stiffeners 86 are joined to each other. As shown in FIG. 11, the left and right inner side wall sections 83 are disposed on and along the left and right side edges 15c and extending in the vertical or up-down direction.

As shown in FIGS. 3 and 4, the left and right gutter stiffeners 86 include left and right upper gutter members 91 and left and right lower gutter members 92, and the left and right upper gutter members 91 and the left and right lower gutter members 91 are joined to each other. The left and right upper gutter members 91 extend from the left and right upper corner sections 31 to the left and right inner side wall sections 83, respectively, (see FIG. 11). The left and right upper gutter members 91 are each formed of a thick plate having a greater thickness than a plate of which each of the left and right lower gutter members 92 is formed. The left and right lower gutter members 92 extend from the left and right inner side wall sections 83 (see FIG. 11) to the left and right lower corner sections 32, respectively. The left and right outer corner members 35 (left and right combination panels 35) are superposed, from outside the vehicle, on the left and right lower gutter members 92 and joined to the left and right lower gutter members 92, respectively, thereby constituting parts of the left and right gutter assemblies 41.

As shown in FIGS. 2 and 11, the left and right side panels 17 include left and right outer side panels 43 disposed on the exterior side of the vehicle, and left and right inner side panels 44 disposed on the interior side of the vehicle. The left and right outer side panels 43 (rear fender panels 43) are disposed on the left and right sides of the vehicle body 11 to thereby constitute outer plate surfaces 81 (outer fender plate surfaces 81 or outer side wall sections 81) of the vehicle body. The left and right inner side panels 44 are disposed inwardly of the left and right outer side panels 43 and constitute inner side walls 19 of the vehicle body. The left and right inner side panels 44 are disposed on and along the left and right side edges 15c of the opening section 15 of the rear part of the vehicle body.

Figure 10:
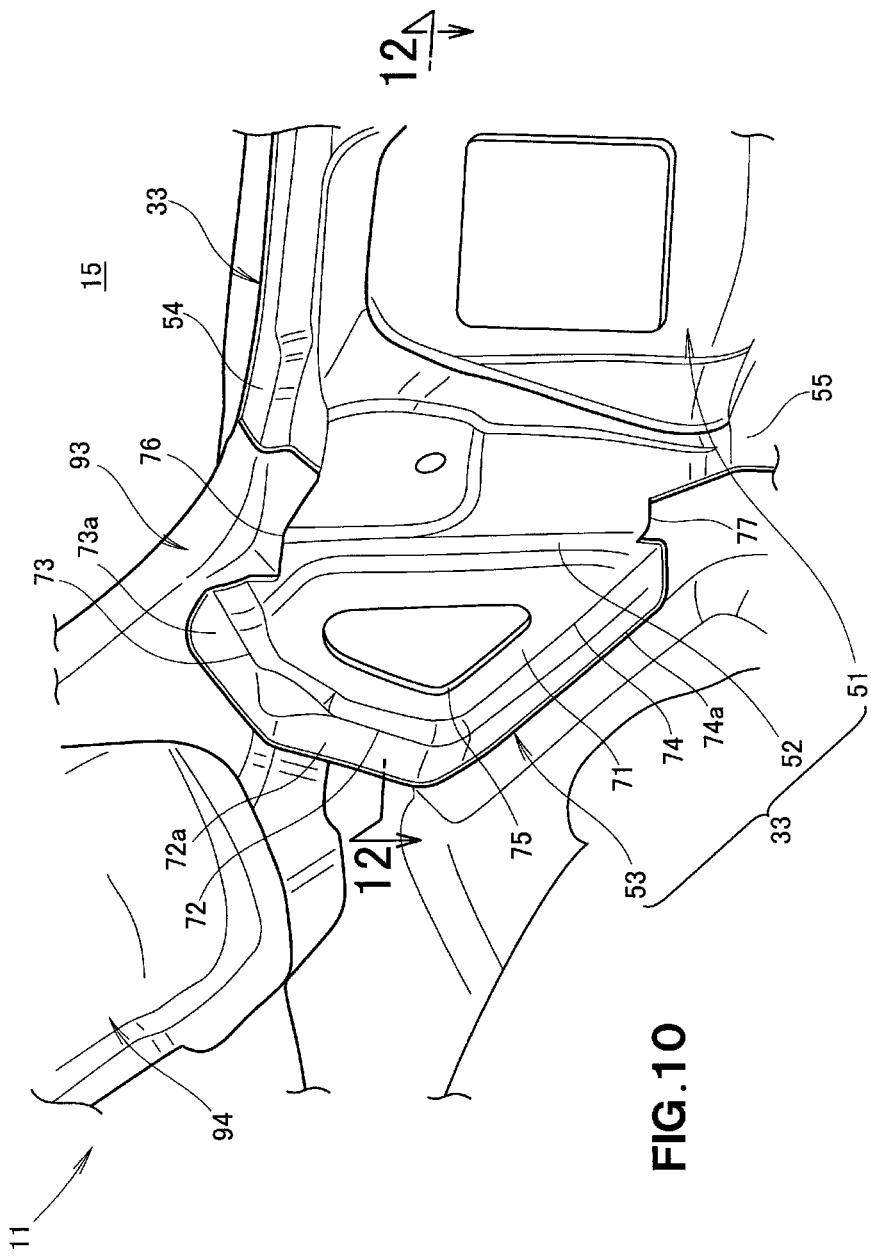
FIG. 10 is a perspective view illustrating a left bulkhead and other components around the left bulkhead shown in FIG. 4.
Figure 12:
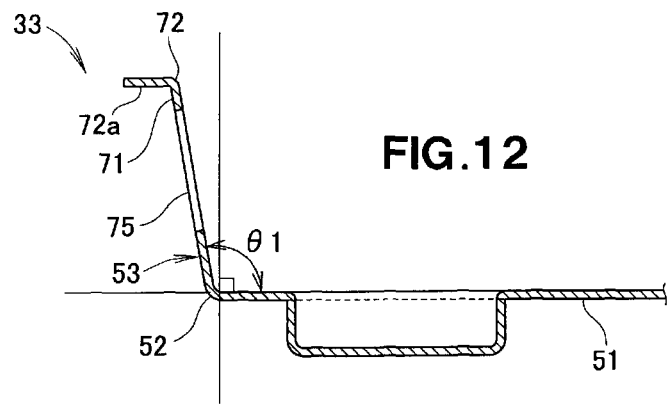
FIG. 12 is a sectional view taken along line 12-12 of FIG. 10.

As shown in FIGS. 4, 10 and 12, the rear outer panel 33 includes a body section 51 disposed in the vehicle-width-intermediate region, left and right bent sections 52, and left and right bulkheads 53.

Figure 9:
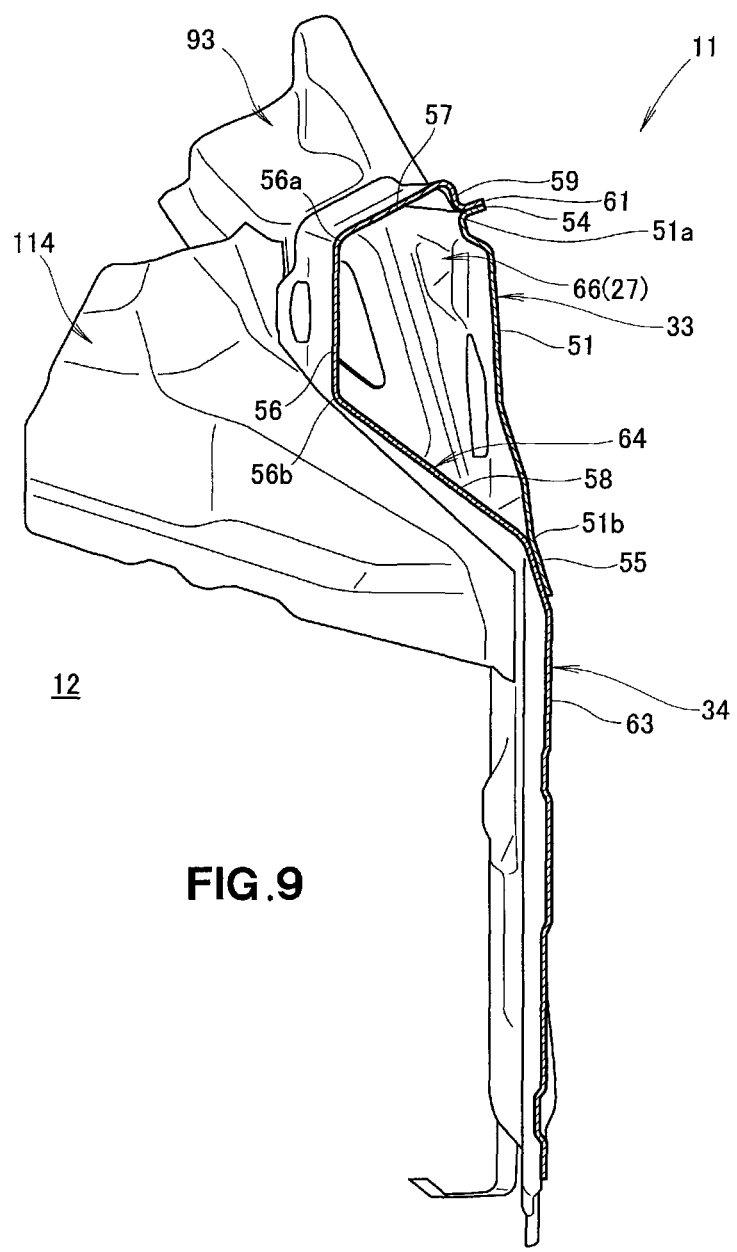
FIG. 9 is a sectional view taken along line 9-9 of FIG. 3.

The body section 51 is a member disposed in opposed relation to the rear surface of the vehicle body and formed in a substantially vertical plate shape along the rear surface of the vehicle body. As shown in FIG. 9, a body-side upper flange 54 extending toward the rear of the vehicle body is formed on the upper end 51a of the body section 51, and a body-side lower flange 55 extending downward is formed on the lower end 51b of the body section 51.

As shown in FIG. 9, the rear inner panel 34 includes a polygonal section part 64 formed on the upper end thereof. The polygonal section part 64 is formed in a channel configuration of a polygonal sectional shape (substantially U sectional shape) hollowed from the rear inner panel 34 toward the front of the vehicle body and extending in the vehicle width direction, and the polygonal section part 64 is closed with the body section 51 of the rear outer panel 33. The body section 51 of the rear outer panel 33 and the polygonal section part 64 of the rear inner panel 34 together constitute an intermediate closed section part 66. The intermediate closed section part 66 forms a part of the closed section part 27 (see FIG. 8).

More specifically, the polygonal section part 64 includes a front wall 56 remotest from the body section 51 in the forward direction of the vehicle body, an upper wall 57 extending from the upper end 56a of the front wall 56 toward the rear of the vehicle body, and a lower wall 58 extending from the lower end 56b of the front wall 56 toward the rear of the vehicle body. On the rear end of the upper wall 57 are formed a stepped portion 59 extending downward from that rear end, and an inner-side upper flange 61 extending from the lower end of the stepped portion 59 toward the rear of the vehicle body. The inner-side upper flange 61 is joined to the body-side upper flange 54 of the body section 51.

Figure 6:
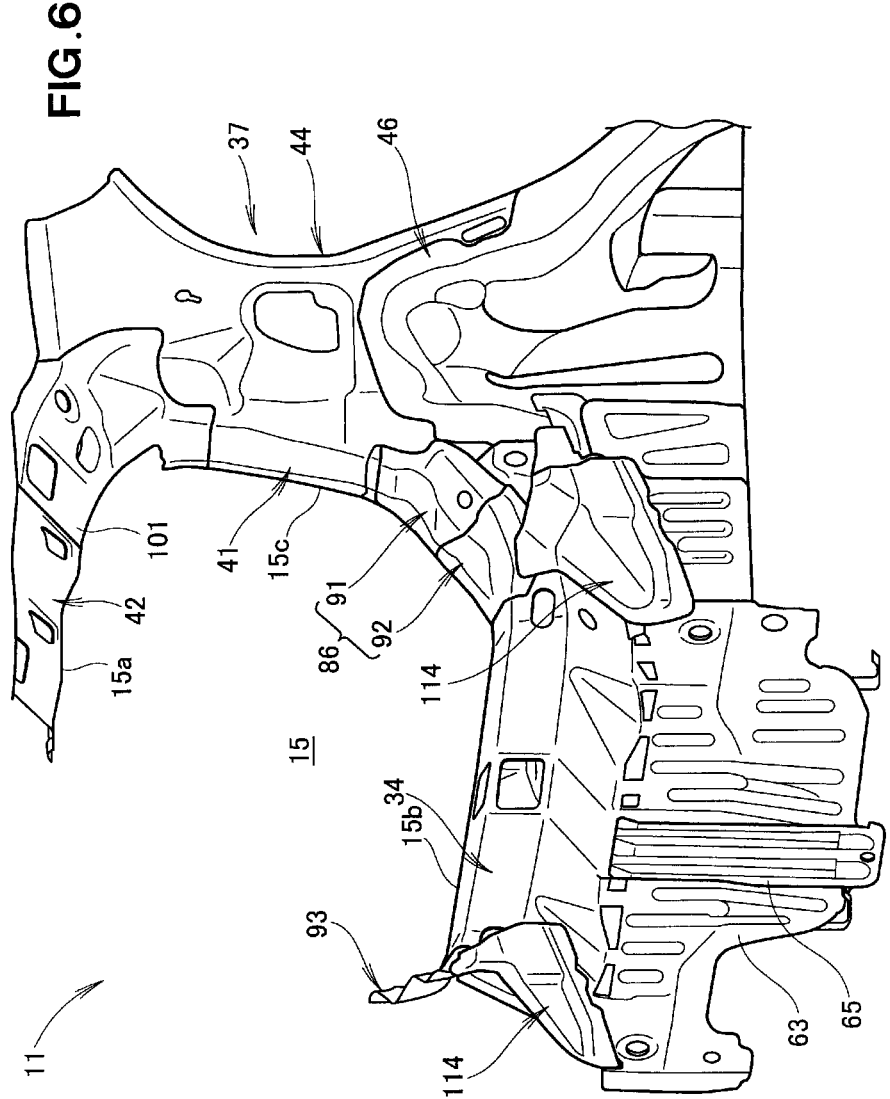
FIG. 6 is a right rear perspective view showing the rear part of the vehicle body of FIG. 5 with a wheel house removed therefrom.

Further, the rear inner panel 34 includes an extended wall section 63 and a reinforcing section 65 (see FIG. 6). As shown in FIGS. 3 and 9, the extended wall section 63 is a vertical plate-shaped member extending from the lower end of the polygonal section part 64, i.e. from the lower end of the lower wall 58, along the rear surface of the vehicle body 11. The reinforcing section 65, which is a member intended to increase the strength and rigidity of the extended wall section 63, is formed to bulge from an intermediate region, in the vehicle width direction, of the extended wall section 63 and extends in the vertical or up-down direction of the vehicle body.

Further, as shown in FIG. 4, the rear inner member 29 includes left and right bulge sections 104 bulging toward the interior of the vehicle. The left and right bulge sections 104 each include the polygonal section part 64 (see FIG. 12) of the rear inner panel 34, and the rear panel extension 93.

As shown in FIGS. 4, 8, 10 and 12, the left and right bent sections 52 are each a section bent from an outer end portion, in the vehicle width direction of the body section 51, toward the front of the vehicle body. The left and right (or plurality of) bulkheads 53 extend from the left and right bent sections 52 toward the left and right rear inner panels 34, respectively, and are disposed to partition the interior of the closed section part 27 into a plurality of regions in the vehicle width direction. Namely, the interior of the rear panel assembly 26, formed in a closed sectional shape with the rear outer member 28 and the rear inner member 29, is partitioned in the vehicle width direction by the plurality of bulkheads 53.

Further, as shown in FIG. 10, each of the bulkheads 53 includes a bulkhead body 71, a front end section 72, an upper end section 73 and a lower end section 74.

The bulkhead body 71 is a section formed by being bent, relative to the body section 51 of the rear outer panel 33, from the bent section (outer end portion in the vehicle width direction) 52 toward the front of the vehicle body. An opening 75 of a substantially triangular shape is formed in a central region of the bulkhead body 71, so that the bulkhead 53 can be reduced in weight.

The front end section 72 of each of the bulkheads 53 extends along the front wall 56 (see FIG. 9) of the polygonal section part 64 and is disposed outwardly, in the vehicle width direction, of the bent section 52. The front end section 72 has a front flange 72a extending outwardly, in the vehicle width direction, of the bent section 52. The front flange 72a is joined to the rear inner member 29 (see FIG. 3).

The upper end section 73 of each of the bulkheads 53 extends along the upper wall 57 of the polygonal section part 64 (see FIG. 9) and has an upper flange 73a. The upper flange 73a extends outwardly, in the vehicle width direction, from the upper end section 73 and is joined to the upper wall 57 of the polygonal section part 64.

The lower end section 74 of each of the bulkheads 53 extends along the lower wall 58 of the polygonal section part 64 (see FIG. 9) and has a lower flange 74a. The lower flange 74a extends outwardly, in the vehicle width direction, from the lower end section 74 and is joined to the lower wall 58 of the polygonal section part 64.

As shown in FIG. 12, an angle $\theta 1$ formed by the body section 51 and the bulkhead 53 is an obtuse angle. Namely, the bulkhead 53 is inclined so that the front end section 72 is disposed more outwardly, in the vehicle width direction, than the bent section 52.

As shown in FIG. 10, a downwardly-hollowed upper recess 76 and an upwardly-hollowed lower recess 77 are formed in opposite sides, in the vehicle width direction, of the rear outer panel 33. More specifically, the left and right "upper recesses 76" are formed between the upper flanges of the left and right bulkheads 53 and the opposite ends, in the vehicle width direction, of the body-side upper flange 54. The left and right "lower recesses 77" are formed between the lower flanges of the left and right bulkheads 53 and the opposite ends, in the vehicle width direction, of the body-side lower flange 55.

The following describe in greater detail the construction of the left and right side panels 17 shown in FIGS. 2 and 11. The inner side panel 44 of each of the left and right side panels 17 (i.e., left or right inner side panel 44) is an integrally formed component including the left or right inner side wall section 83 and a left or right inner rear wall section 84. The inner side wall section 83 is a vertical plate-shaped member, while the inner rear wall section 84 is a vertical plate-shaped member bent from the rear end of the inner side wall section 83 toward the vehicle width center.

The outer side panel 43 of each of the left and right side panels 17 (i.e., left or right outer side panel 43) is an integrally formed component including the outer side wall section 81 and an outer rear wall section 82. The outer side wall section 81 is joined at its front end to the front end of the corresponding (i.e., left or right) inner side wall section 83. The outer side wall section 81 is a vertical plate-shaped member spaced outwardly, in the vehicle width direction, from the corresponding inner side wall section 83 and extending in the front-rear direction. The outer side wall section 81 extends a predetermined distance from the front end of the corresponding inner side wall section 83 and then extends toward the rear of the vehicle body. The outer rear wall section 82 of the outer side panel 43 of each of the left and right side panels 17 bends from the rear end of the corresponding (i.e., left or right) outer side wall section 81 to be joined to the corresponding (i.e., left or rear) inner rear wall section 84.

As shown in FIG. 11, the left and right gutter stiffeners 86 are provided in the left and right side panels 17, respectively. Each of the left and right gutter stiffeners 86 is disposed in an interior space surrounded by the corresponding (left or right) outer side wall section 81 and inner side wall section 83, extends in the vertical or up-down direction of the vehicle body and is joined to the corresponding inner side panel 44. Each of the left and right gutter stiffeners 86 is formed in a substantially U shape as viewed in plan which opens toward the outer surface of the corresponding (left or right) inner side panel 44. Also, each of the left and right gutter stiffeners 86 is joined at its opposite ends to the outer surface of the corresponding (left or right) inner side wall section 83 (i.e., outer surface of the corresponding inner side panel 44). Thus, the left and right closed section parts 39, each having a closed sectional shape and extending in the up-down direction of the vehicle body, are constructed by the corresponding inner side wall sections 83 and gutter stiffeners 86. Namely, each of the left and right closed section parts 39 is disposed between the corresponding (left or right) outer side wall section 81 and the corresponding (left or right) inner side wall section 83 and extends in the vertical or up-down direction of the vehicle body.

Figure 21:
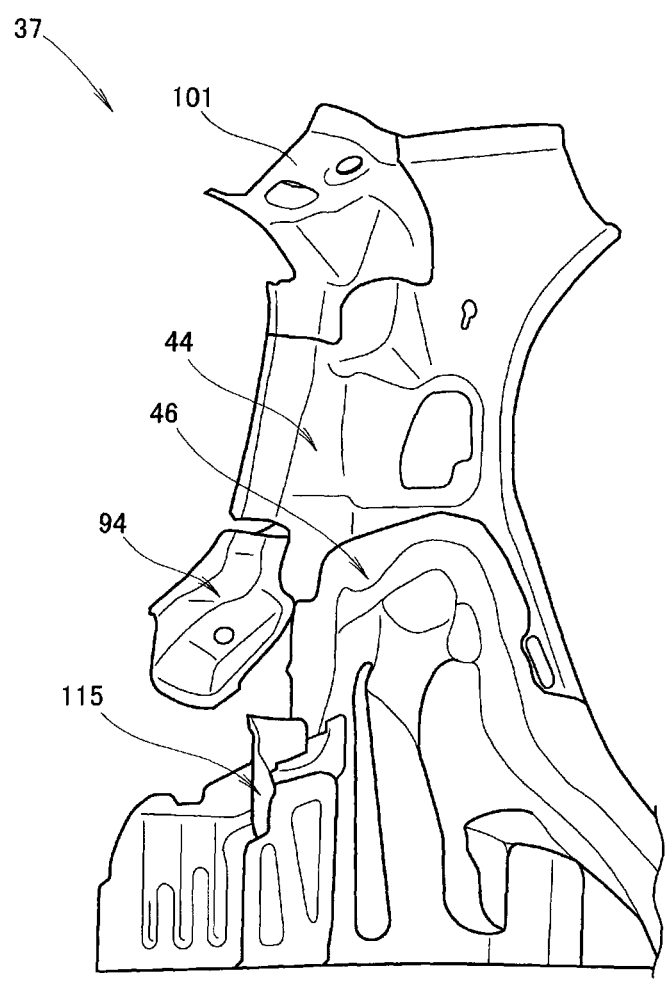
FIG. 21 is a left rear view of a left side component shown in FIG. 4.

Further, as shown in FIGS. 4 and 21, the side panel assembly 37 comprises, as its main components, the rear wheel house 21, the inner side panel 44, the gutter extension 94 and a gutter gusset 115.

Further, as shown in FIGS. 3 and 4, the left and right upper corner sections 31 each include an upper corner bracket (left or right corner bracket) 101 and an upper portion 91a of the left or right upper gutter member 91 placed on the corresponding upper corner bracket 101. The rear roof rail 42 extending in the vehicle width direction is joined at its opposite ends to the corner brackets 101 of the left and upper corner sections 31.

Figure 13:
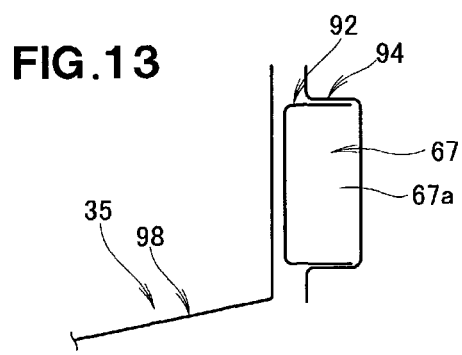
FIG. 13 is a sectional view taken along line 13-13 of FIG. 3.
Figure 14:
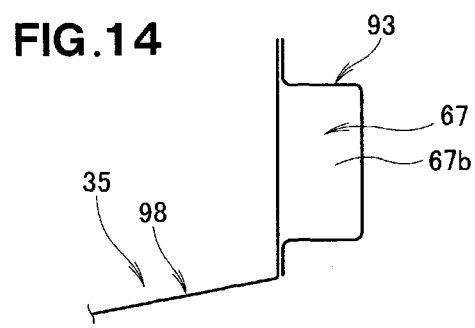
FIG. 14 is a sectional view taken along line 14-14 of FIG. 3.

The left and right lower corner sections 32 each include the left or right vehicle-exterior-side or outer corner member 35 (FIG. 3), and a left or right vehicle-interior-side or inner corner member 36 (FIG. 4). The left and right outer corner members 35 are joined to the body section 51 of the rear outer panel 33 and to the corresponding left and right lower gutter members 92. As shown in FIG. 6, the left and right inner corner members 36 are joined to the left and right lower gutter members 92. The left and right outer corner members 35 and the left and right inner corner members 36 together constitute left and right lower corner's closed section parts 67 (FIG. 3), respectively. Further, as shown in FIGS. 3, 13 and 14, the left and right lower corner's closed section parts 67 each include an upper closed portion 67a and a lower closed section portion 67b.

As further shown in FIGS. 3 and 4, the "lower closed section portion 67b" of each of the left and right lower corner's closed section parts 67 is formed in a closed sectional shape with the rear panel extension 93, gutter extension 94 and inner upper combination member 98. The closed section part 27 comprises a combination of the intermediate closed section part 66 and the lower closed portion 67b of the lower corner's closed section parts 67 connecting to the intermediate closed section part 66. Namely, the intermediate closed section part 66 and the lower closed portion 67b of the left and right lower sections 67 are constructed continuously with each other.

Further, as shown in FIG. 4, the left and right inner corner members 36 each comprise the left or right rear panel extension 93 and the left or right gutter extension 94. The rear panel extension 93 is formed of a plate greater in thickness than a plate of which the gutter extension 94 is formed, and the panel extension 93 extends from the rear inner panel 34 outwardly in the vehicle width direction. Each of the left and right gutter extensions 94 is joined at its upper end portion 94a to the vehicle-interior-side (or inner) surface of the corresponding lower gutter member 92. Further, each of the left and right gutter extensions 94 is joined at its lower end portion 94b to the corresponding rear panel extension 93.

As further shown in FIGS. 3 and 4, the upper closed portion 67a of each of the left and right lower corner closed section parts 67 is formed in a closed sectional shape with the left or right lower gutter member 92 and the upper end portion 94a of the left or right gutter extension 94. As shown in FIG. 3, the upper closed portion 67a is joined to the gutter's closed section part 39 (see FIG. 11). Because the upper closed portion 67a includes the lower gutter member 92, it can be regarded as a portion of the gutter's closed section part 39.

Figure 7:
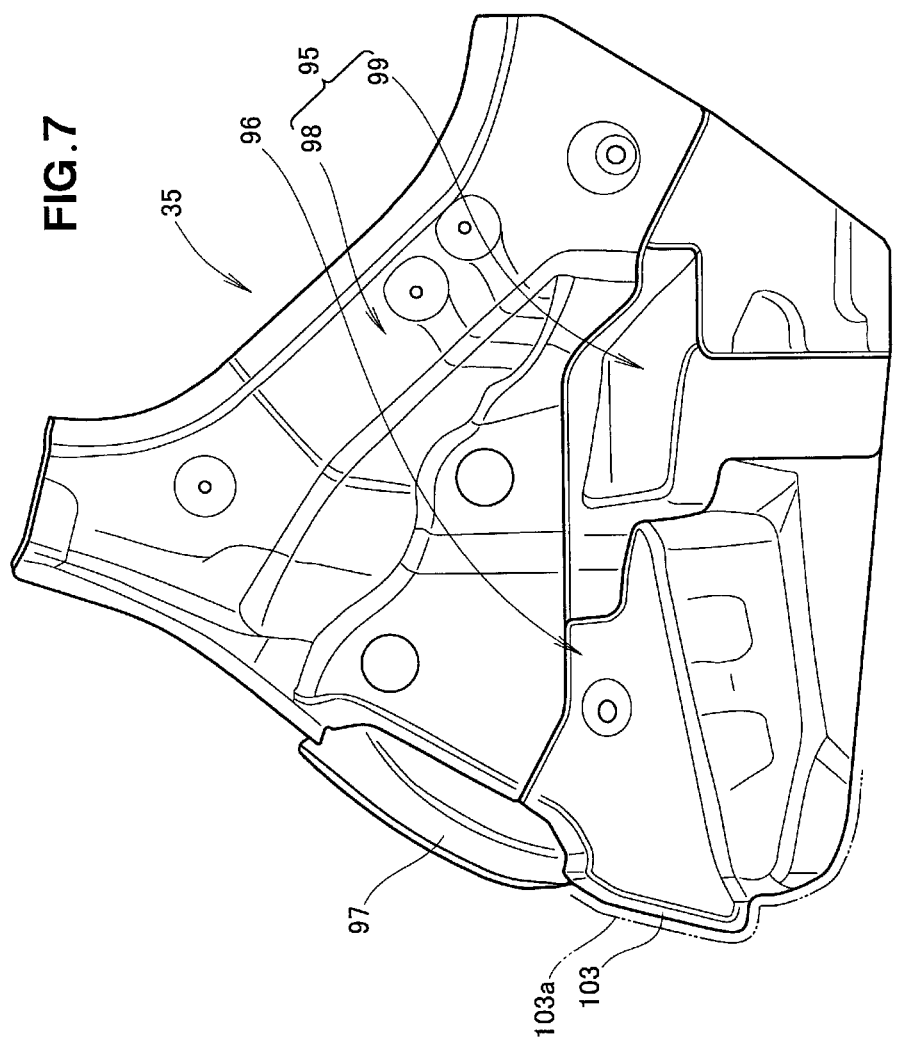
FIG. 7 is a perspective view of the left combination panel shown in FIG. 3.

The following describe the left and right outer corner members 35 shown in FIGS. 3, 7 and 8. The left and right outer corner members 35 are located close to the corresponding (left and right) lower corner sections 32, respectively, (i.e., close to a peripheral edge of the opening section 15), and they comprise the left and right combination panels 35, respectively. Namely, the left and right outer corner members 35 are the same as (i.e., function as) the left and right outer combination panels 35 and thus will hereinafter be sometimes referred to as "left and right outer combination panels 35". The left and right outer combination panels 35 are members for accommodating the left and right rear combination lamps 23 (FIG. 1), respectively, disposed adjacent to the peripheral edge of the opening section 15.

The following describe in greater detail the left outer corner member 35. Because the right outer corner member 35 is constructed in left-right symmetric relation to the left outer corner member 35, it is represented by the same reference numeral, and description of the right outer corner member 35 is omitted here to avoid unnecessary duplication.

The left combination panel 35 comprises an inner combination member 95 disposed on a part of the peripheral edge of the opening section 15, and a side combination member 96 disposed outwardly, in the vehicle width direction, of the inner combination member 95. The inner combination member 95 is formed of a plate greater in thickness than a plate of which the side combination member 96 is formed, and it is disposed in the lower corner section 32. The inner combination member 95 includes the lower-half, inner upper combination member 98 and an upper-half, inner lower combination member 99. Further, the left combination panel 35 includes a rear combination extension 97 that extends from the inner combination member 95 and side combination member 96 toward the front of the vehicle body.

The left combination panel 35 is jointed not only to one end, in the vehicle width direction, of the body section 51 of the rear outer panel 33 but also to a lower end portion of the lower gutter member 92. More specifically, the inner upper combination member 98 is joined to the body section 51 and the lower gutter member 92. The inner lower combination member 99 is joined to the body section 51.

Further, as shown in FIGS. 1 and 8, the left and right rear wheel houses 21, which cover respective upper half portions of the left and right rear wheels 18, are disposed forwardly or in front of the rear panel assembly 26 and constitute parts of the inner walls 19 of the left and right side sections of the vehicle body (i.e., left and right inner side walls 19 defining the passenger compartment 12). Namely, as shown in FIG. 8, the left and right rear wheel houses 21 are located close to or adjacent to the front end of the rear panel assembly 26. Further, the left and right rear wheel houses 21 each include a (left or right) support section 49 (damper support section 49) for supporting an upper end portion of a corresponding one of left and right rear suspension dampers 48 (hereinafter referred to simply as "rear dampers 48"). The left and right rear suspensions are devices for suspending the left and right rear wheels 18 on the left and right rear wheel houses 21.

More specifically, as shown in FIGS. 2, 4 and 8, the left and right rear wheel houses 21 each include a vehicle-exterior-side or outer wheel house member 45 and a vehicle-interior-side or inner wheel house member 46, and the outer wheel house member 45 and the inner wheel house member 46 are joined to each other. The outer wheel house member 45 is joined to the corresponding (left or right) inner side panel 44 (see FIG. 3). The inner wheel house member 46 constitutes the inner side wall 19 and includes the support section 49.

Figure 15:
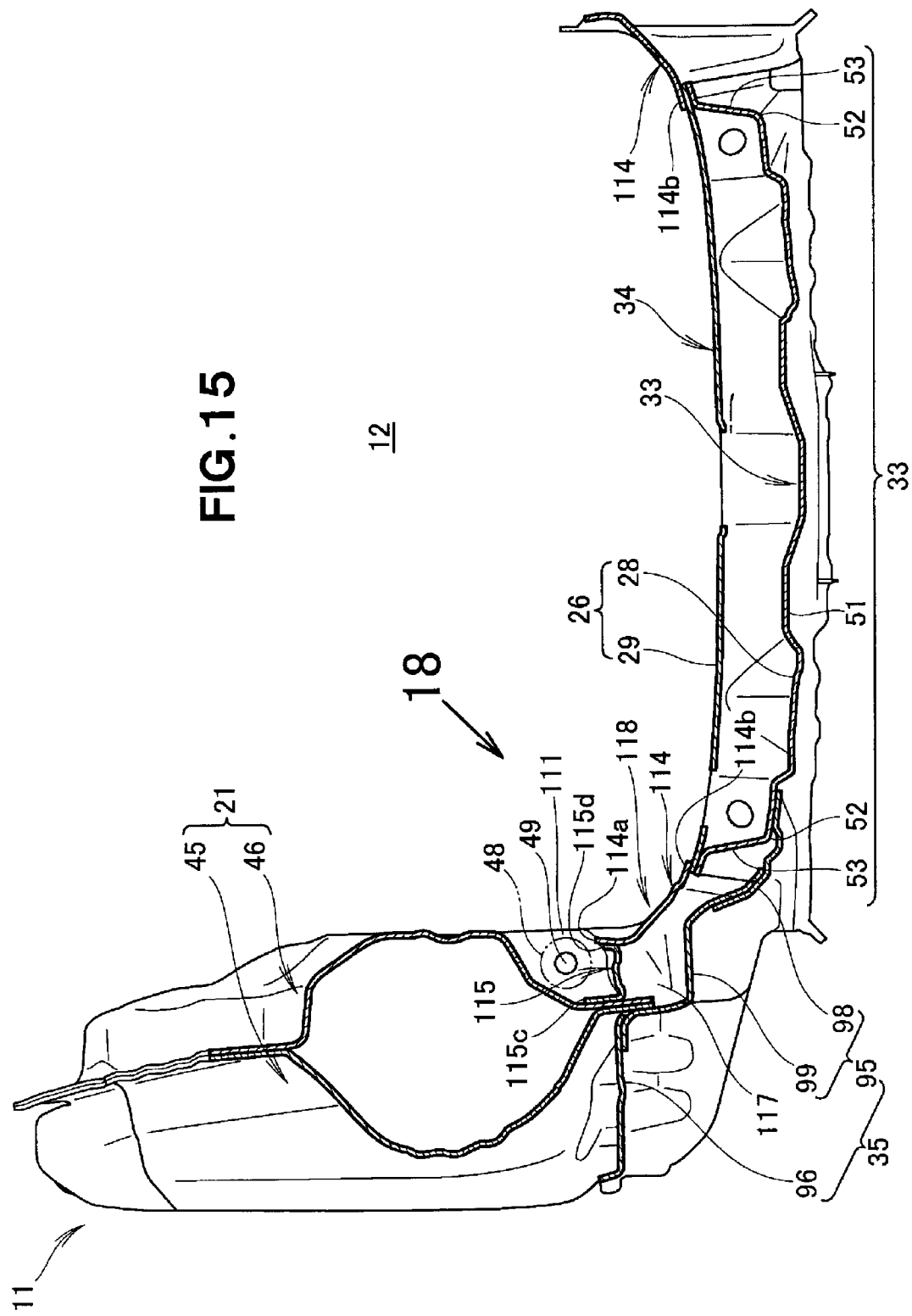
FIG. 15 is a sectional view taken along line 15-15 of FIG. 3.
Figure 16:
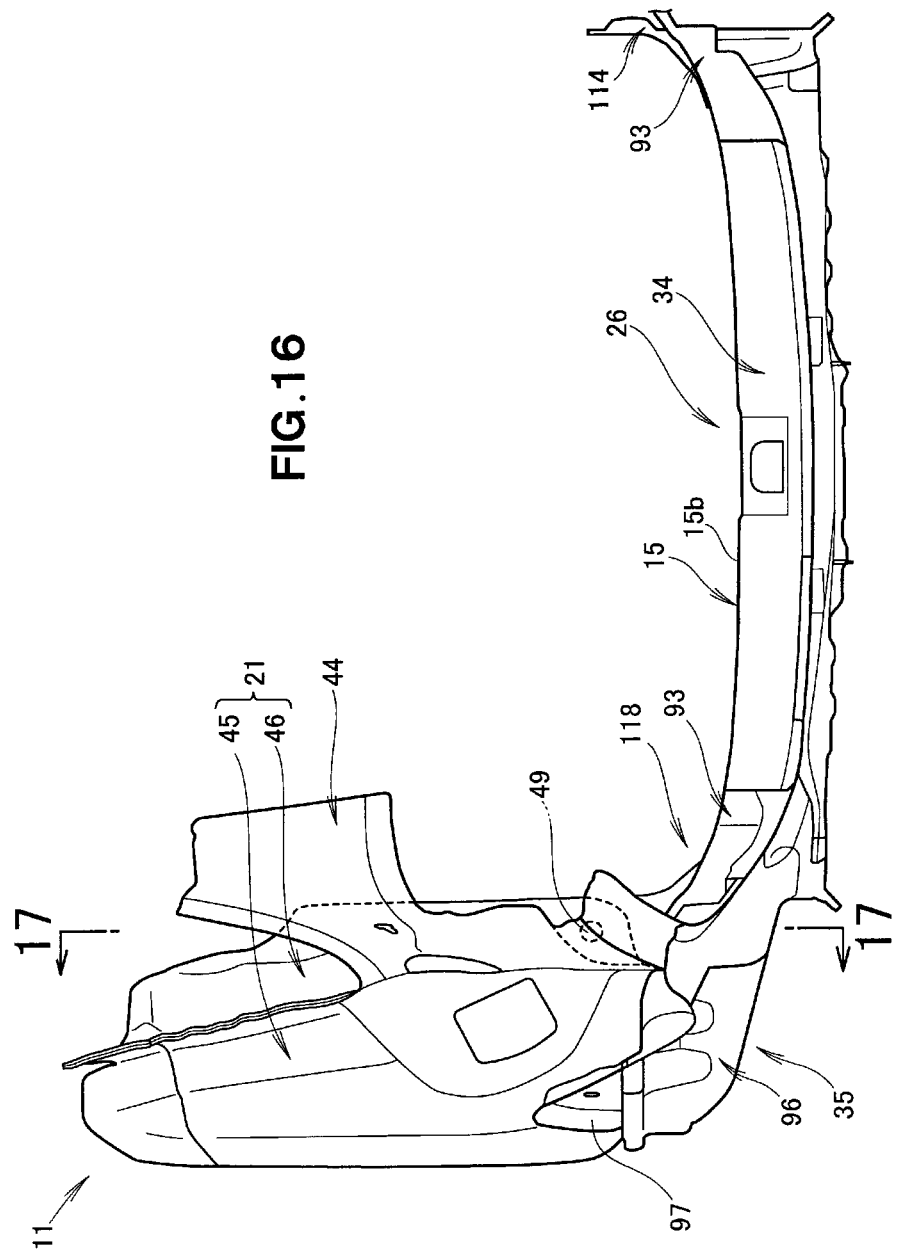
FIG. 16 is a plan view showing a portion of the rear part of the vehicle body of FIG. 3 with a part broken away.
Figure 17:
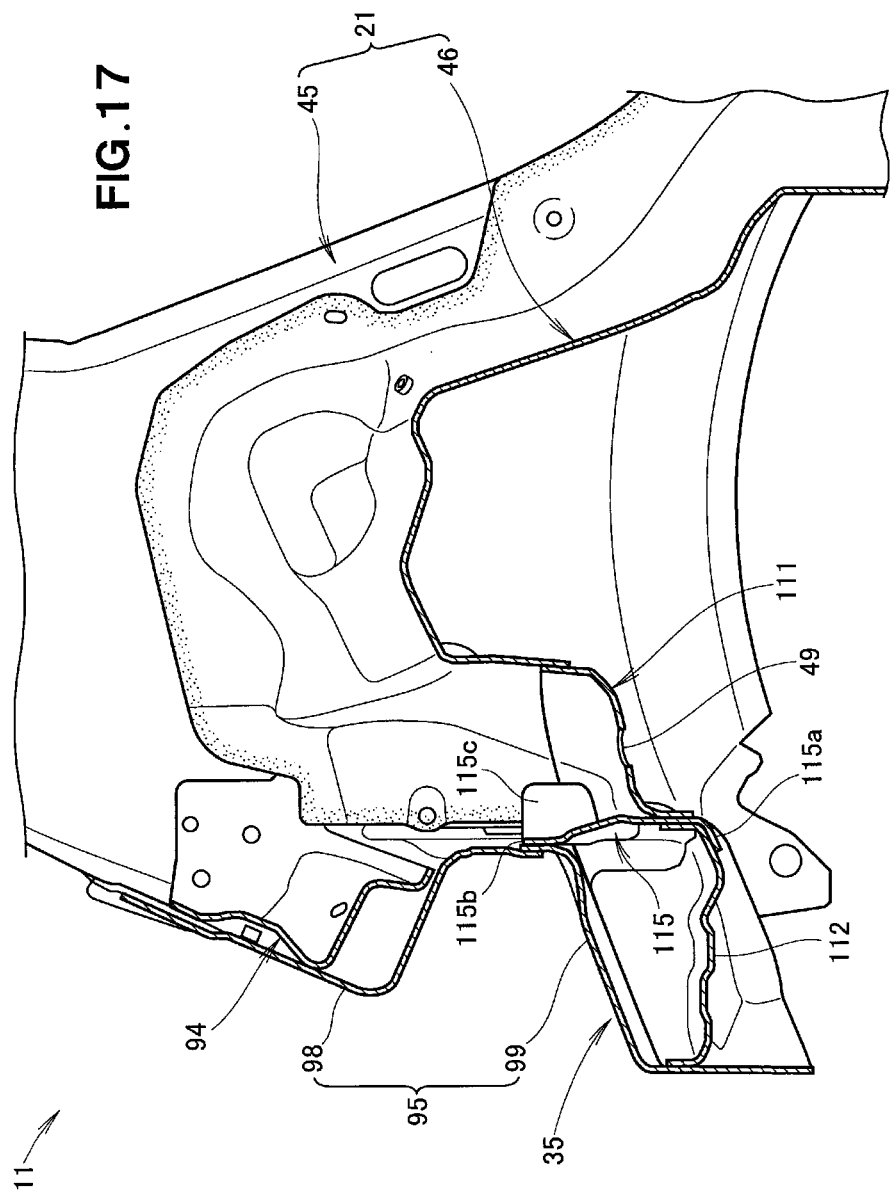
FIG. 17 is a sectional view taken along line 17-17 of FIG. 16.

Further, as shown in FIGS. 15 and 16 to 18, left and right damper bases 111 for supporting the left and right rear dampers 48 and left and right wheel house extensions 112 extending from the left and right damper bases 111 toward the rear of the vehicle body are provided on the left and right inner wheel house members 46, respectively. The left and right damper bases 111 each include the support section 49 for supporting the corresponding (left or right) rear damper 48. As shown in FIG. 17, each of the left and right wheel house extensions 112 is provided substantially horizontally between the inner lower combination member 99 of the left or right combination panel 35 and the left or right damper base 111.

Further, as shown in FIG. 15, left and right panel gussets 114 (first gussets 114) and left and right gutter gussets 115 (second gussets 115) are provided on vehicle-interior-side corner sections 118 between the rear wheel houses 21 and the rear panel assembly 26.

Figure 18:
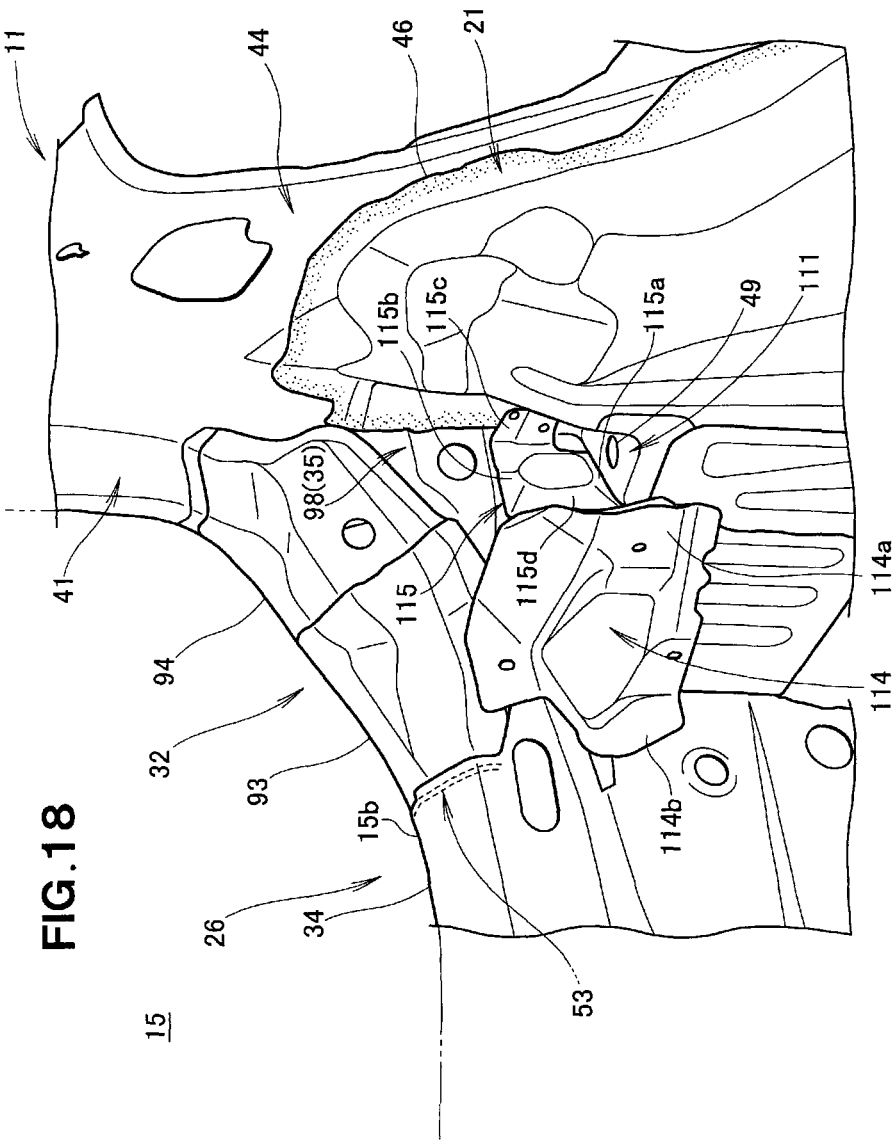
FIG. 18 is a perspective view as seen in the direction of arrow 18 of FIG. 15.

Further, as shown in FIGS. 15, 18 and 21, the left and right panel gusset 114 are members interconnecting the left and right rear wheel houses 21, the rear inner panel 34 of the rear panel assembly 26 and the respective rear panel extensions 93 of the left and right lower corner sections 32.

More specifically, the left and right panel gusset 114 extend from their respective one end portions 114a, joined to the left and right rear wheel houses 21, toward the rear of the vehicle body while slanting toward the vehicle width center so that their respective other end portions 114b are joined to the rear panel assembly 26. Positions where the other end portions 114b of the left and right panel gusset 114 are joined are located at or near the positions where the plurality of (e.g., left and right) bulkheads 53 are disposed relative to the rear panel assembly 26. Further, the respective one end portions 114a of the left and right panel gusset 114 are joined to end portions 115d, closer to the vehicle width center, of the left and right gutter gusset 115.

Further, as shown in FIGS. 15, 17 and 18, the left and right gutter gusset 115 are each a member interconnecting the left or right rear wheel house 21 and the left or right gutter assembly 41. More specifically, the left and right gutter gussets 115 are joined at their respective one end portions 115a to the inner wheel house members 46 of the left and right rear wheel houses 21 directly or via the damper bases 111. Further, the left and right gutter gussets 115 extend upwardly from the respective one end portions 115a to their respective other (or upper) end portions 115b. The other end portions 115b are joined to the left and right gutter assemblies 41 directly or via the left and right inner upper combination members 98 and the gutter extensions 94. Respective outer end portions 115c, in the vehicle width direction, of the left and right gutter gussets 115 are joined to the left and right inner wheel house members 46.

Namely, each of the left and right gutter gussets 115 is joined to the corresponding (left or right) inner upper combination member 98, inner lower combination member 99, inner wheel house member 46, damper base 111 and wheel house extension 112.

As shown in FIG. 15, left and right gusset's closed section parts 117 are provided in individual vehicle-interior-side corner sections 118 between the left and right rear wheel houses 21 and the rear panel assembly 26. Each of the left and right gusset's closed section parts 117 is constructed in a closed sectional shape, as viewed in plan, with a left or right rear wall formed by the rear panel assembly 26 and left or right combination panel 35, an outer wall formed by the left or right rear wheel house 21 and disposed on the outer side in the vehicle width direction (i.e. vehicle-width outside), an inner wall formed by the left or right panel gusset 114 and disposed on the inner side in the vehicle width direction (i.e., vehicle-width inside), and a front wall formed by the left or right gutter gusset 115.

Next, with reference to FIGS. 7, 19 and 21, a description will be given about an example manner in which the rear part of the vehicle body 11 is manufactured. First, the combination component 35 (i.e., combination panel 35) shown in FIG. 7, a rear panel component 121 shown in FIGS. 19 and 20 and the side component 37 shown in FIG. 21 are assembled separated separately from one another.

As shown in FIG. 7, the combination component 35 includes the inner combination member 95, the side combination member 96 and the rear combination extension 97.

Figure 19:
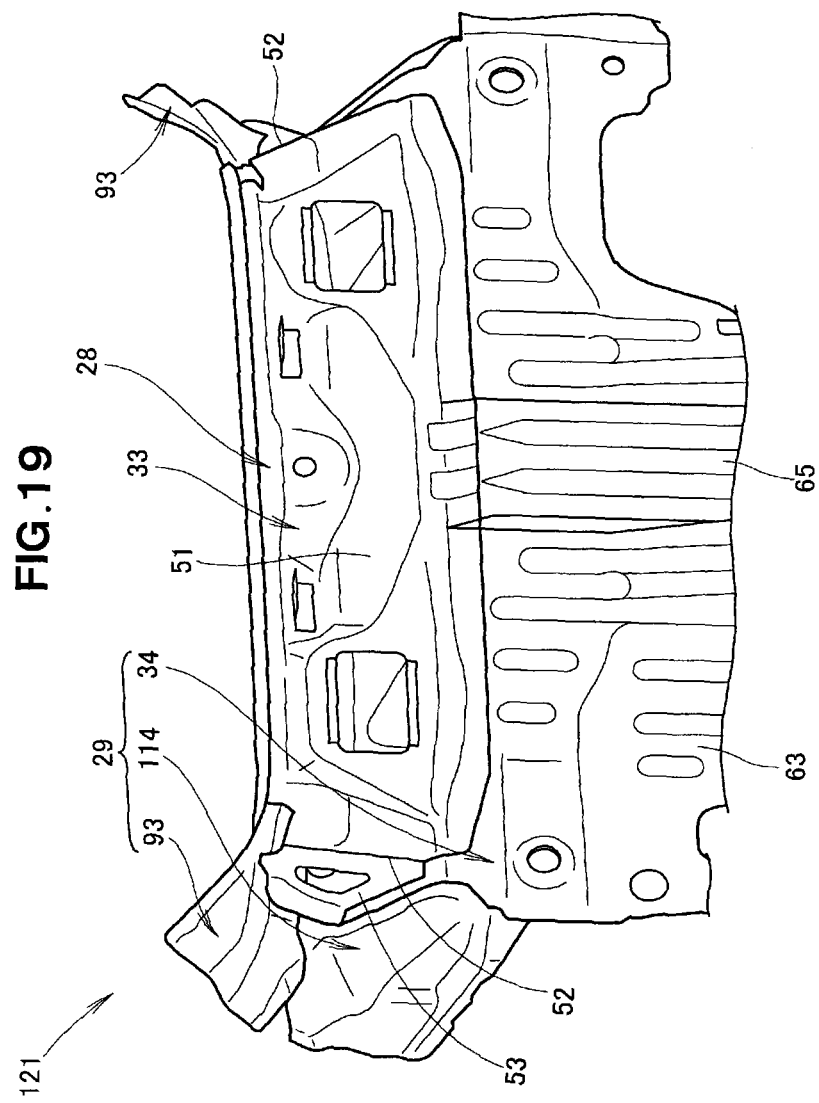
FIG. 19 is a left rear view of a rear panel component shown in FIG. 4.
Figure 20:
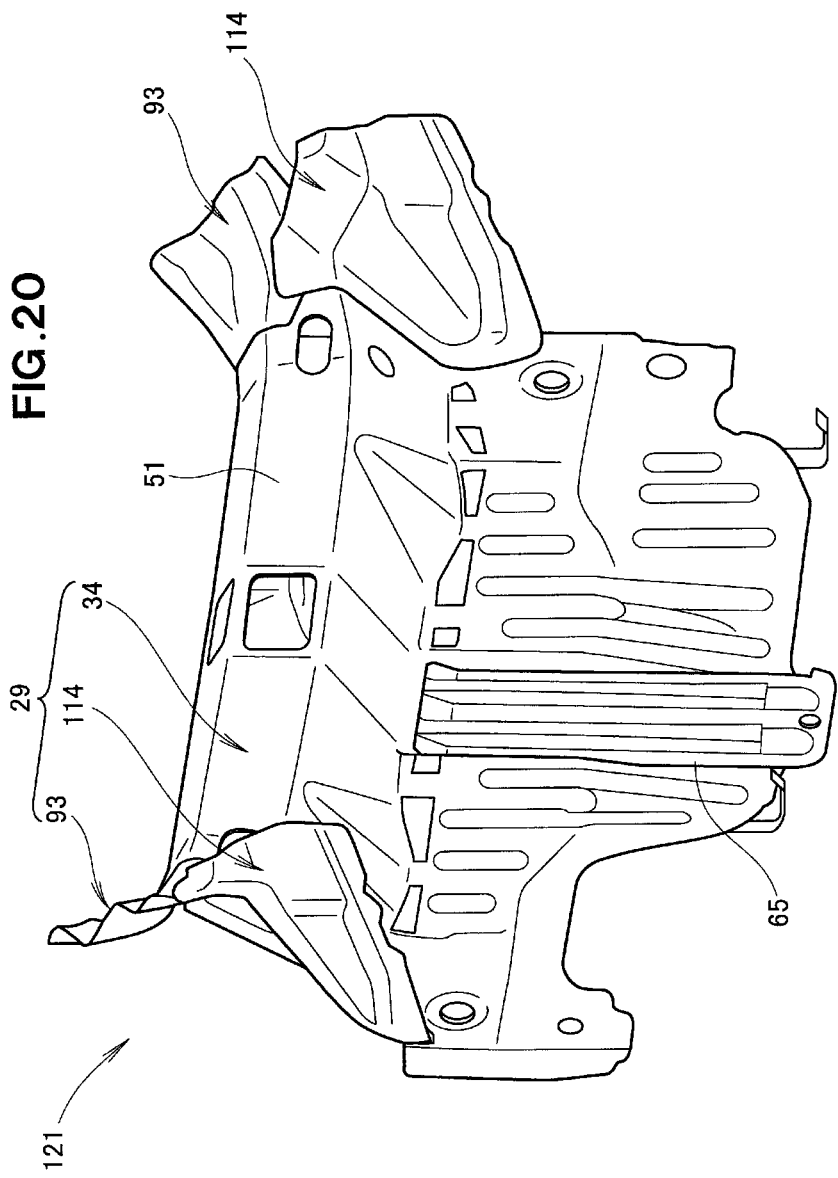
FIG. 20 is a right rear view of the rear section of the rear panel component shown in FIG. 19.

Further, as shown in FIGS. 19 and 20, the rear panel component 121 includes: the rear outer panel 33 (i.e., a part of the rear outer member 28); the rear inner panel 34 (i.e., a part of the rear inner member 29); the rear panel extensions 93; and the panel gussets 114.

As shown in FIG. 21, the side component 37 (side panel assembly 37) comprises the inner side panel 44, the outer wheel house member 45 (see FIG. 11), the inner wheel house member 46, the gutter extension 94, the upper corner bracket 101, and the gutter gusset 115.

Then, in a manufacturing line, the combination component 35, the side component 37 and the rear panel component 121 are assembled to one another.

Finally, the outer side panels 44 are attached to the combination component 35, the side component 37 and the rear panel component 121 having been assembled to one another as noted above, so that predetermined manufacturing of the rear part of the vehicle body is completed.

Figure 22:
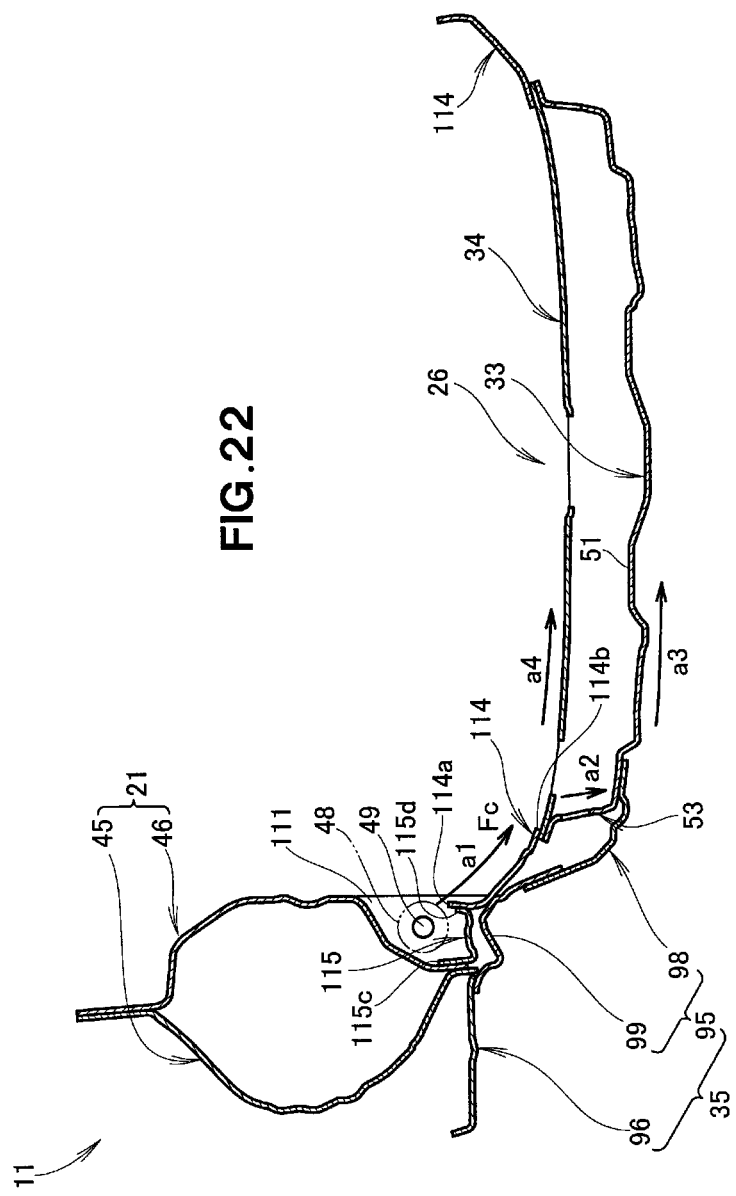
FIG. 22 is a view explanatory of behavior of the embodiment by which a damper load transmitted from left and right rear suspension dampers of FIG. 8 to left and right support sections is transmitted to a rear panel assembly.

Next, with reference to FIGS. 22 and 23, a description will be given about load transmitting performance of the rear part of the vehicle body 11. FIG. 22 is a view showing how a load Fc (damper load Fc) transmitted from the left and right rear dampers 48 to the left and right support sections 49 is further transmitted to the rear panel assembly 26.

The damper load Fc is transmitted from the left and right rear dampers 48 to the rear panel assembly 26 by way of the left and right damper bases 111 and the left and right panel gussets 114, as indicated by arrow a1. The damper load Fc having been transmitted to the rear panel assembly 26 is then transmitted to the left and right bulkheads 53 formed integrally with the rear outer panel 33 as indicated by arrow a2 and further transmitted to the body section 51 of the rear outer panel 33 as indicated by arrow a3. Further, the damper load Fc transmitted to the panel gusset 114 is transmitted from the panel gusset 114 to the rear inner panel 34 as well, as indicated by arrow a4.

In the aforementioned manner, the left and right panel gussets 114 can efficiently and smoothly transmit the load Fc (damper load Fc), having been transmitted from the left and right rear dampers 48 to the left and right support sections 49, from the left and right rear wheel houses 21 to the rear panel assembly 26 for dispersion via the rear panel assembly 26. Thus, the instant embodiment can not only increase bending rigidity, in the vehicle width direction, of the left and right rear wheel houses 21 by means of the rear panel assembly 26 extending in the vehicle width direction, but also increase rigidity of the left and right support sections 49. As a consequence, the instant embodiment can even further increase the overall rigidity of the entire vehicle body 11. In addition, external force (mainly, external force in the vehicle width direction) having acted on the rear panel assembly 26 from outside the vehicle body 11 can be efficiently transmitted, by means of the left and right panel gusset 114, to the left and right rear wheel houses 21 for dispersion via the rear wheel houses 21. As a consequence, the left and right panel gussets 114 can be disposed at corners between the left and right wheel houses 21 constituting parts of the inner side walls 19 and the rear panel assembly 26 extending in the vehicle width direction, Thus, the instant embodiment can secure a maximum space in the interior of the vehicle compartment.

Figure 23:
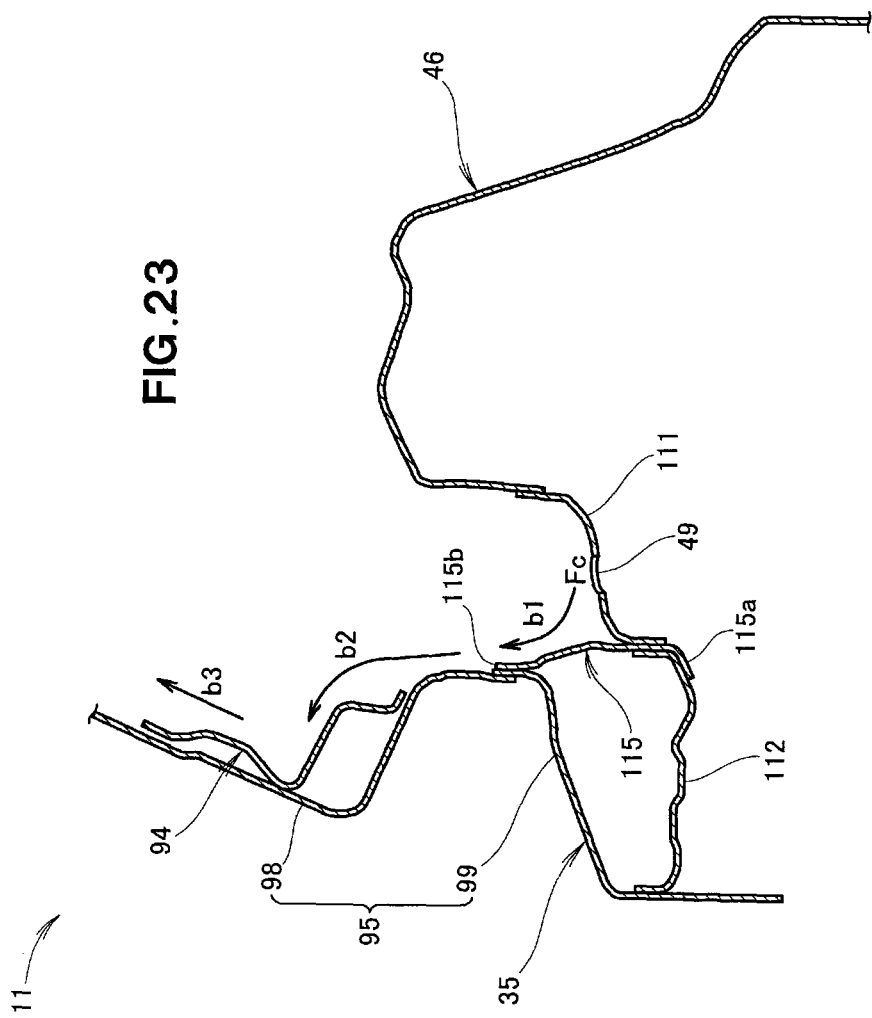
FIG. 23 is a view explanatory of behavior of the embodiment by which the damper load transmitted from the left and right rear suspension dampers of FIG. 22 to the left and right support sections is transmitted to left and right gutter assemblies.

Further, the damper load Fc (mainly, vertical load) transmitted from the left and right rear dampers 48 to the damper bases 111 is transmitted to the left and right gutter gussets 115 as indicated by arrow b1 in FIG. 23. The damper load Fc, having been thus transmitted to the left and right gutter gussets 115, is then transmitted to the inner combination members 95 of the left and right combination panels 35 as indicated by arrow b2. The damper load Fc, thus transmitted to the left and right inner combination members 95, is further transmitted to the left and right gutter assemblies 41 (FIG. 3) via the left and right gutter extensions 94 as indicated by arrow b3.

In this way, the left and right gutter gussets 115 can efficiently and smoothly transmit the vertical load Fc (damper load Fc), having been transmitted from the left and right rear dampers 48 to the left and right damper support sections 49, from the left and right rear wheel houses 21 to the left and right gutter assemblies 41 for dispersion via the gutter assemblies 41. Thus, the instant embodiment can increase the rigidity of the left and right rear wheel houses 21 and the left and right damper support sections 49. As a result, the instant embodiment can even further increase the overall rigidity of the entire vehicle body 11. In addition, external force (mainly, vertical external force) having acted on the left and right gutter assemblies 41 from outside the vehicle body 11 can be efficiently and smoothly transmitted, by means of the left and right gutter assemblies 41, to the left and right rear wheel houses 21 for dispersion via the rear wheel houses 21. Because the rigidity of the left and right gutter assemblies 41 can be increased in this way, the rigidity of the left and right side edges 15c of the opening section 15 can be increased. As a result, the instant embodiment can even further increase the overall rigidity of the entire vehicle body 11.

Further, as shown in FIGS. 18 and 21, because each of the gutter gussets 115 extends upwardly from the one end portion 115a, joined to the rear wheel house 21, so that the other end portion 115b is joined to the gutter assembly 41 via the combination 35 and gutter extension 94, the instant embodiment can efficiently transmit a load to the gutter assembly 41 (gutter's closed section part 39) over the length thereof. In this way, the instant embodiment can achieve an enhanced load transmitting efficiency.

Further, as shown in FIGS. 18 and 22, because each of the panel gussets 114 is joined at its one end portion to the end portion 115d, closer to the vehicle width center, of the gutter gusset 115, the instant embodiment can even further increase the rigidity at and around the support section 49 of the rear damper 48. Further, irrespective of a direction in which a load is input to the rear damper 48, the load can be transmitted to the rear panel assembly 26 and gutter assembly 41. In this way, the instant embodiment can achieve an enhanced load transmitting efficiency.

Further, as shown in FIGS. 15 and 16. the combination panel 35 is provided for accommodating the rear combination lamp 23 disposed adjacent to peripheral edge (corner section) 32 of the opening section 15, and the outer end portion 115c, in the vehicle width direction, of the gutter gusset 115 is joined to the rear wheel house 21. Thus, the gusset's closed section part 117 is constructed on the corner section 118 between the rear panel assembly 26 and the rear wheel house 21 with the rear panel assembly 26 and the combination panel 35 functioning as a rear wall, the rear wheel house 21 functioning as a vehicle-width-outside or outer wall, the panel gusset 114 functioning as a vehicle-width-inside or inner wall and the gutter gusset 115 functioning as a front wall. In this way, the instant embodiment can achieve an increased vehicle body rigidity. Particularly, because the gusset's closed section part 117 is constructed on the corner section 118 between the rear panel assembly 26 and the rear wheel house 21, torsional rigidity of the vehicle body 11 can be increased to a considerable degree.

Further, as shown in FIGS. 3, 4 and 15, the rear panel assembly 26 not only constitutes the closed section part 27, extending in the vehicle width direction, with the rear outer member 28 and the rear inner member 29, but also includes the bulkheads 53 disposed to partition the interior of the closed section part 27 into a plurality of regions in the vehicle width direction.

Because the other end portion 114b of each of the panel gusset 114 is joined near the position where the bulkhead 53 is disposed, a load from the panel gusset 114 can be transmitted to the entire rear panel assembly 26 rather than only to the rear inner member 29. In this way, the instant embodiment can achieve an enhanced load transmitting efficiency.

Further, as shown in FIG. 18, the combination panel 35 constitutes a part of the gutter assembly 41. The combination panel 35 where the rear combination 23 is accommodated is provided in addition to the panels constituting the gutter assembly 41. Because the combination panel 35 constitutes a part of the gutter assembly 41, the instant embodiment can reduce the number of necessary panels and thus can achieve a reduced number of necessary component parts.

Furthermore, as shown in FIGS. 3 and 7, the combination panel 35 includes the inner combination member 95 disposed on the peripheral edge (lower corner section) 32 of the opening section 15, and the side combination member 96 disposed outwardly, in the vehicle width direction, of the inner combination member 95. Because the inner combination member 95 is formed of a plate greater in thickness than a plate of which the side combination member 96 is formed, the side combination member 96 can achieve an enhanced load transmitting performance. As a result, the instant embodiment can simultaneously achieve enhancement of the load transmitting performance and reduction of the overall weight of the vehicle body.

Furthermore, as shown in FIGS. 2, 3 and 11, each of the left and right side panels 17 includes the inner side panel 44 disposed on and along the left or right side edge 15c of the opening section 15, formed in the rear part of the vehicle body, and constituting the inner side wall 19 of the vehicle body, and the outer side panel 43 disposed outwardly of the inner side panel 44 and constituting the outer side surface of the vehicle body.

Because the inner side panel 44 comprises the inner side wall section 83 extending in the front-rear direction of the vehicle body and the inner rear wall section 84 bent from the rear end of the inner side wall section 83 toward the vehicle width center, it would not bulge toward the passenger compartment (interior of the vehicle) 12. Thus, the instant embodiment can secure a sufficient space in the interior of the vehicle.

Furthermore, because the outer side panel 43 comprises the outer side wall section (outer fender plate surface) 81 extending in the front-rear direction while being spaced a predetermined distance outwardly, in the vehicle width direction, from the inner side wall section 83, and the outer rear wall section 82 bent from the outer side wall section 81 toward the vehicle width center and joined to the inner rear wall section 84, the instant embodiment can reduce the number of necessary component parts as compared to a case where a framework is constructed by joining separate component parts.

Furthermore, because the instant embodiment includes the gutter stiffener 86 that is joined to the outer surface of the inner side panel 44 to bulge outwardly from the inner side panel 44 and that constitutes the closed section (gutter's closed section) 39 extending in the vertical direction between the inner side wall section 83 and the outer side wall section 81, the instant embodiment can achieve an increased rigidity of the opening section 15 in the rear part of the vehicle body.

Furthermore, as shown in FIGS. 3 and 11, the opening section 15 is formed in a rectangular shape with the rear panel assembly 26 disposed on and along the lower edge 15b and extending in the vehicle width direction, the rear roof rail 42 disposed on and along the upper edge 15a and extending in the vehicle width direction, and the gutter assembly 41 disposed on and along the left and right side edges 15c to extend in the vertical direction and comprising the inner side wall section 83 and the gutter stiffener 86. Also, the opening section 15 includes the lower corner section 32 that is a connection section between the rear panel assembly 26 and the gutter assembly 41, and the upper corner section 31 provided between the rear roof rail 42 and the gutter assembly 41.

Because the gutter stiffener 86 includes the lower gutter member 92 extending from the inner side wall section 83 to the lower corner section 32 and the upper gutter member 91 extending from inner side wall section 83 to the upper corner section 31, the closed section (gutter's closed section) 39 can connect to the upper and lower corner sections 31 and 32 via the gutter stiffener 86. For example, even in a case where the gutter stiffener 86 is formed in a shape corresponding to the shape of the upper and lower corner sections 31 and 32, it is possible to maintain desired formability of the gutter stiffener 86 because the gutter stiffener 86 is separated from the upper and lower corner sections 31 and 32 by the upper gutter member 91 and the lower gutter member 92.

Further, as shown in FIGS. 3 and 4, the rear panel assembly 26 constitutes the closed section part 27, extending in the vehicle width direction, with the rear inner member 29 including the bulge section 104 bulging toward the interior 12 of the vehicle and the rear outer member 28 including the body section 51 joined to the vehicle-exterior-side surface of the bulge section 104.

Furthermore, the lower corner section 32 includes the inner corner member 36 disposed on the interior side of the vehicle and having the lower gutter member 92 joined thereto, and the outer corner member 35 disposed on the lower corner section 32 on the exterior side of the vehicle, joined not only to the body section 51 and gutter section 92 but also to the inner corner member 36 and constituting the closed section (lower corner's closed section) part 67 in conjunction with the inner corner member 36.

Furthermore, in the rear panel assembly 26 constituting the lower edge 15*b* of the opening section 15, the rear inner member 29 disposed adjacent to the interior 12 of the vehicle is bulged to form the closed section part 27. Also, in each of the inner side panels 44 constituting the left and right edged 15*c* of the opening section 15, the gutter stiffener 86 disposed adjacent to the exterior of the vehicle is bulged outwardly to form the closed section (gutter's closed section) 39. Therefore, it is difficult to provide a closed section continuously in the lower corner section 32 of the opening section 15.

Thus, in the instant embodiment, the inner corner members 36 and the outer corner members 35 are disposed to form the lower corner's closed section parts 67, so that the intermediate closed section 66, the left and right lower corner's closed section parts 67 and the gutter's closed section part 39 can be provided continuously from the lower edge 15*b* of the opening section 15 through to the left and right side edges 15*c* of the opening section 15. Thus, even in the case where the gutter's closed section parts 39 of the left and right side edges 15*c* are formed on the outer sides of the inner side panels 44, the instant embodiment can achieve an increased rigidity of the rear vehicle body.

Furthermore, as shown in FIGS. 3 and 4, the rear outer member 28 includes the rear outer panel 33 constituting a vehicle-width-intermediate region, and the rear inner member 29 includes the rear inner panel 34 constituting a vehicle-width-intermediate region. The inner corner member 36 includes the rear panel extension 93 extending from the rear inner panel 34 outwardly in the vehicle width direction, and the gutter extension 94 joined at its upper end portion 94*a* to the vehicle interior side of the lower gutter member 92 to constitute the upper closed portion 67*a* of the lower corner's closed section part 67 in conjunction with the lower gutter member 92 and joined at its lower end portion 94*b* to the rear panel extension 93.

The gutter extension 94 is provided on the vehicle interior side of the lower gutter member 92 that constitutes the gutter's closed section part 39 in a vehicle-exterior-side region of the inner side panel 44, and the upper portion 67*a* of the lower corner's closed section part 67 is formed by a lower portion 92*b* of the lower gutter member 92 and the gutter extension 94. Namely, the gutter's closed section part 39 constituted by the inner side panel 44 and the upper portion 92*a* of the lower gutter member 92 and the lower corner's closed section part 67 constituted by the lower portion 92*b* of the lower gutter member 92 and the gutter extension 94 can be provided continuously with each other.

For example, even in a case where sets of the left and right inner side panels 44 and the left and right gutter stiffeners 86, joined to each other in advance, are assembled sequentially from the vehicle width outside toward the vehicle width center, the instant embodiment can achieve an enhanced productivity because each of the inner corner members 36 comprises separate components, i.e. the gutter extension 94 and the rear panel extension 93.

Namely, because the closed sections are provided continuously from the lower edge 15*b* through to the left and right side edges 15*c* of the opening section 15, the instant embodiment can secure a sufficient rigidity of the opening section 15 of the rear part of the vehicle body. Further, because each of the inner corner members 36 comprises separate components, i.e. the gutter extension 94 and the rear panel extension 93, the instant embodiment can achieve an enhanced productivity.

Furthermore, because the rear panel extension 93 is formed of a plate greater in thickness than a plate of which the gutter extension 94 is formed, as shown in FIGS. 3, 4 and 6, the rigidity of the lower corner section 32 can be increased. Moreover, because the gutter extension 94 forms the upper portion 67*a* of the closed section (lower corner's closed section) part 67 in conjunction with the lower gutter member 92, the rigidity of the gutter extension 94 need not be so great as the rigidity of the rear panel extension 93. Thus, the gutter extension 94 is formed of a relatively thin plate so that the overall weight of the vehicle body 11 can be reduced.

Furthermore, as shown in FIGS. 2 and 3, the outer corner member 35 is a combination panel disposed near the lower corner section 32 for accommodating the rear combination lamp 23 (see FIG. 1); namely, the outer corner member 35 functions also as the combination panel 35 without requiring addition of any other member. Thus, the instant embodiment can reduce the number of necessary component parts. Moreover, because the combination panel 35 is joined to the body section 51 and the lower gutter member 92, the rigidity of the lower corner section 32 can be increased.

Furthermore, as shown FIGS. 3 and 7, the combination panel 35 includes the inner combination member 95 disposed on the peripheral edge (lower corner section) of the opening section 15, and the side combination member 96 disposed outwardly, in the vehicle width direction, of the inner combination member 95.

Because the inner combination member 95 is formed of a plate greater in thickness than a plate of which the side combination member 96 is formed, the load transmitting performance of the side combination member 96 can be enhanced. Further, because the inner combination member 96 is formed of a relatively thin plate, the overall weight of the vehicle body 11 can be reduced.

Furthermore, as shown in FIGS. 3 and 11, the upper gutter member 91 is formed of a plate greater in thickness than a plate of which the lower gutter member 92 is formed.

Moreover, the closed section (gutter's closed section) 39 of the gutter stiffener 86 is disposed outwardly, in the vehicle width direction, of the inner side panel 44. Consequently, the closed section (gutter's closed section) 39 would be undesirably limited in size so that a sufficient rigidity of the opening section 15 cannot be secured. Thus, in the instant embodiment, the upper gutter member 91 is formed of a plate greater in thickness than a plate of which the lower gutter member 92 is formed, to secure a sufficient rigidity. Further, in the instant embodiment, the lower gutter member 92 and other components therearound are reinforced with the combination panel 35, and thus, the lower gutter member 92 is reduced in thickness and hence in weight.

Furthermore, as shown in FIGS. 2 to 4, the instant embodiment includes the rear outer member 28 and the rear inner member 29 that together constitute the closed section part 27 extending in the vehicle width direction on and along the lower edge 15*b* of the opening section 15 of the rear vehicle body. The rear outer member 28 includes the rear outer panel 33 constituting the vehicle-width-intermediate region, and the rear inner member 29 includes the rear inner panel 34 constituting the vehicle-width-intermediate region.

Further, the rear outer panel 33 includes the body section 51 forming a surface opposed to the rear surface of the vehicle body 11, the bent section 52 bent from the outer end portion, in the vehicle width direction of the body section 51, the plurality of bulkheads 53 extending forwardly from the bent sections 52 toward the inner panel 34 and partitioning the interior of the closed section part 27 into a plurality of regions in the vehicle width direction. Namely, the instant embodiment can reduce the number of necessary component parts and cost by integrating the bulkheads 53 with the rear outer panel 33. Because the bulkheads 53 are integrated at their rear ends with the rear outer panel 33, they need not be joined to any other component parts. Therefore, there is no need to form insertion holes for insertion of a spot welding gun or joining flanges. In this way, the instant embodiment can simplify the shape of the rear outer panel 33 and improve formability of the rear outer panel 33.

Furthermore, because the front end portion 72 of each of the bulkheads 53 is disposed outwardly, in the vehicle width direction, of the bent section 52, the bent section 52 can be formed in an obtuse angle when the rear outer panel 33 is press-formed; thus, the formability of the bent section 52 can be enhanced.

Furthermore, because each of the bulkheads 53 has the front flange 72a extending from the front end section 72 outwardly in the vehicle width direction to be joined to the rear inner member 29, as shown in FIGS. 9 and 10, the instant embodiment can achieve an increased rigidity of the closed section part 27 constituted by the rear outer member 28 and the rear inner member 29. For example, if the front flange 72a is oriented outwardly in the vehicle width direction, it is possible to even further increase the formability at the time of the press forming.

Further, as shown in FIGS. 9 and 10, the rear inner panel 34 has the polygonal section part 64 including: the front wall 56 opposed to the body section 51; and an opening portion 62 defined by the upper and lower walls 57 and 58 bent rearwardly from the upper and lower ends 56a and 56b, respectively, of the front wall 56 and opening toward the rear of the vehicle body.

Thus, each of the plurality of bulkheads 53 has: the upper end section 73 formed to extend along the upper wall 57 of the polygonal section part 64; the lower end section 74 formed to extend along the lower wall 58 of the polygonal section part 64; the upper flange 73a extending outwardly, in the vehicle width direction, from the upper end section 73 and joined to the upper wall 57 of the polygonal section part 64; and the lower flange 74a extending outwardly, in the vehicle width direction, from the lower end section 74 and joined to the lower wall 58 of the polygonal section part 64. Thus, the rigidity of the closed section part 27 can be increased. For example, if the upper and lower flanges 73a and 74a are oriented outwardly in the vehicle width direction, it is possible to even further increase the formability at the time of the press forming.

Furthermore, as shown in FIGS. 9 and 10, the body-side upper flange 54 is formed on the upper end 51a of the body section 51, and the rear outer panel 33 has, between the upper flange 73a of the bulkhead 53 and the body-side upper flange 54, the upper recess 76 formed by recessing the upper flange 73a and the body-side upper flange 54. If, for example, a flange is to be formed continuously in a region between the upper flange 73a and the body-side upper flange 54, the flange would be difficult to form because it requires a deep drawing process. Thus, the instant embodiment is constructed to enhance the formability of the rear outer panel 33 by recessing that region as noted above.

Furthermore, as shown in FIGS. 9 and 10, the body-side lower flange 55 is formed on the lower end 51b of the body section 51, and the rear outer panel 33 has, between the lower flange 74a of the bulkhead 53 and the body-side lower flange 55, the lower recess 77 formed by recessing the lower flange 74a and the body-side lower flange 55. If, for example, a flange is to be formed continuously in a region between the lower flange 74a and the body-side lower flange 55, the flange would be difficult to form because it requires a deep drawing process. Thus, the instant embodiment is constructed to enhance the formability of the rear outer panel 33 by recessing that region as noted above.

Furthermore, as shown in FIGS. 3, 9 and 10, the rear inner panel 34 includes the extended wall section 63 extending downward from the closed section part 27. The closed section part 27 disposed on and along the lower edge 15b of the opening section 15 in the rear part of the vehicle body is spaced from a floor of the vehicle body depending on the design of the vehicle body 11. Thus, in such a case, the lower end of the rear outer panel 33 may be extended downward below the closed section part 27 to thereby form the extended wall section 63 connecting to the vehicle body floor. Further, in the case where the bulkhead 53 is integrated with the rear outer panel 33 and where the extended wall section 63 is formed on the rear outer panel 33, there is a likelihood that the formability and yield rate of the rear outer panel 33 will undesirably decrease. Thus, the instant embodiment is constructed to improve the formability and yield rate of the rear outer panel 33 by providing the extended wall section 63 on the rear inner panel 34.

Note that, whereas the embodiment of the present invention has been described as applied to the vehicle 10 where the tailgate 16 is openably/closably mounted on the opening section 15, the present invention is not so limited. For example, the present invention may be applied to a vehicle of a type where a glass plate is fitted in the opening section 15.

INDUSTRIAL APPLICABILITY

The rear vehicle body structure of the present invention is well suited of application to passenger vehicles, such as sedans and wagons.

LEGEND

11 . . . vehicle body, 15 . . . opening section, 15a . . . upper edge, 15b . . . lower edge, 15c . . . side edge. 17 . . . side panel, 19 . . . inner wall, 21 . . . rear wheel house, 23 . . . rear combination lamp, 26 . . . rear panel assembly, 28 . . . rear outer member, 29 . . . rear inner member, 31 . . . upper corner section, 32 . . . lower corner section, 33 . . . rear outer panel, 34 . . . rear inner panel, 35 . . . corner outer member (combination panel), 36 . . . inner corner member, 39 . . . gutter's closed section part, 41 . . . gutter assembly, 42 . . . rear roof rail, 43 . . . outer side panel, 44 . . . inner side panel, 48 . . . rear suspension damper, 49 . . . support section, 51 . . . body section, 52 . . . bent section, 53 . . . bulkhead, 54 . . . body-side upper flange, 55 . . . body-side lower flange, 56 . . . front wall, 56a . . . upper end, 57 . . . upper wall, 58 . . . lower wall, 63 . . . extended wall section, 64 . . . polygonal section part, 72 . . . front end section, 72a . . . front flange, 73 . . . upper end section, 73a . . . upper flange, 74 . . . lower end section, 74a . . . lower flange, 76 . . . upper recess, 77 . . . lower recess, 81 . . . outer side wall section, 83 . . . inner side wall section, 84 . . . inner rear wall section, 86 . . . gutter stiffener, 91 . . . upper gutter member, 92 . . . lower gutter member, 93 . . . rear panel extension, 94 . . . gutter extension, 95 . . . inner combination member, 96 . . . side combination member, 104 . . . bulge section, 114 . . . panel gusset, 114a . . . one end portion, 114b . . . other end portion, 115a . . . one end portion, 115b . . . other end portion, 115c . . . outer end portion in a vehicle width direction, 115d . . . end portion closer to a vehicle width center, 117 . . . gusset's closed section part, 118 . . . corner section

The invention claimed is:

1. A rear vehicle body structure comprising: an opening section formed in a rear surface of a vehicle body; a rear panel assembly of a closed sectional shape disposed on and along a lower edge of the opening section and extending in a vehicle width direction; and left and right rear wheel houses disposed in front of the rear panel assembly and constituting parts of inner walls of left and right side sections of the vehicle body, the left and right rear wheel houses including support sections for supporting left and right rear suspension dampers, wherein the rear vehicle body structure further comprises left and right panel gussets interconnecting the rear panel assembly and the left and right rear wheel houses, and wherein the left and right panel gussets extend from their respective one end portions, connected to the left and right rear wheel houses, toward a rear of the vehicle body while slanting toward a vehicle width center, the left and right panel gussets being joined at their respective other end portions to the rear panel assembly, further comprising:

left and right gutter assemblies each having a closed sectional shape, the left and right gutter assemblies being disposed on and along left and right side edges of the opening section and extending in an up-down direction of the vehicle body;

left and right gutter gussets interconnecting the left gutter assembly and the left rear wheel house and the right gutter assembly and the right rear wheel house, respectively, left and right combination panels disposed adjacent to a peripheral edge of the opening section; and left and right gusset's closed section parts provided on corner sections between the left and right rear wheel houses and the rear panel assembly, respectively, wherein the left and right gusset's closed section parts are each constructed in a closed sectional shape, as viewed in plan, with a left or right rear wall formed by the rear panel assembly and the left or right combination panel, an outer wall formed by the left or right rear wheel house and disposed on an outer side in the vehicle width direction, an inner wall formed by the left or right panel gusset and disposed on an inner side in the vehicle width direction, and a front wall formed by the left or right gutter gusset.

2. The rear vehicle body structure according to claim 1, wherein the left and right gutter gussets extend from their respective one end portions, jointed to the left and right rear wheel houses, in an upward direction of the vehicle body in such a manner that their respective other end portions are joined to the gutter assemblies.

3. The rear vehicle body structure according to claim 2, wherein the left and right panel gussets are joined at their respective one end portions to end portions, closer to the vehicle width center, of the left and right gutter gussets.

4. The rear vehicle body structure according to claim 3, wherein the left and right combination panels accommodate left and right rear combination lamps, respectively; and wherein the left and right gutter gussets are joined at their respective outer end portions in the vehicle width direction to the left and right rear wheel houses.

5. The rear vehicle body structure according to claim 4, wherein the left and right combination panels constitute parts of the left and right gutter assemblies, respectively.

6. The rear vehicle body structure according to claim 5, wherein the left and right combination panels each comprise a left or right inner combination member disposed on the peripheral edge of the opening section and a left or right side combination member disposed outwardly, in the vehicle width direction, of the left or right inner combination member, and the left and right inner combination members are each formed of a plate greater in thickness than a plate of which each of the left and right side combination members is formed.

7. The rear vehicle body structure according to claim 1, wherein the rear panel assembly comprises a rear outer member disposed on an exterior side of the vehicle and extending in the vehicle width direction, and a rear inner member disposed on an interior side of the vehicle and extending in the vehicle width direction, an interior of the rear panel assembly, formed in a closed sectional shape with the rear outer member and the rear inner member, is partitioned in the vehicle with direction by a plurality of bulkheads, and positions where the other end portions of the left and right panel gussets are joined to the rear panel assembly are located at or near positions where the plurality of bulkheads are disposed relative to the rear panel assembly.

8. A rear vehicle body structure comprising: an opening section formed in a rear surface of a vehicle body; a rear panel assembly of a closed sectional shape disposed on and along a lower edge of the opening section and extending in a vehicle width direction; and left and right rear wheel houses disposed in front of the rear panel assembly and constituting parts of inner walls of left and right side sections of the vehicle body, the left and right rear wheel houses including support sections for supporting left and right rear suspension dampers, wherein the rear vehicle body structure further comprises left and right panel gussets interconnecting the rear panel assembly and the left and right rear wheel houses, and wherein the left and right panel gussets extend from their respective one end portions, connected to the left and right rear wheel houses, toward a rear of the vehicle body while slanting toward a vehicle width center, the left and right panel gussets being joined at their respective other end portions to the rear panel assembly, and further comprising:

left and right gutter assemblies each having a closed sectional shape, the left and right gutter assemblies being disposed on and along left and right side edges of the opening section and extending in an up-down direction of the vehicle body; and left and right gutter gussets interconnecting the left gutter assembly and the left rear wheel house and the right gutter assembly and the right rear wheel house, respectively, and left and right side panels disposed on left and right side edges, respectively, of the opening section and constituting side sections of the vehicle body, and left and right gutter stiffeners provided in the left and right side panels, respectively, wherein the left and right side panels each comprise a left or right inner side panel disposed on an interior side of the vehicle, and a left or right outer side panel disposed on an exterior side of the vehicle, the left and right inner side panels each comprise a left or right inner side wall section extending in a front-rear direction of the vehicle body, and a left or right inner rear wall section bent from a rear end of the left or right inner side wall section toward the vehicle width center, the outer side panels each comprise a left or right outer side wall section extending in the front-rear direction while being spaced a predetermined distance outwardly, in the vehicle width direction, from the left or right inner side wall section, and a left or right outer rear wall section bent from the left or right outer side wall section to be joined to the left or right inner rear wall section, the left and right gutter stiffeners are each disposed in an interior space surrounded by the left or right inner side wall section and the left or right outer side wall section, and left and right gutter's closed section parts each having a closed sectional shape and extending in the up-down direction of the vehicle body are defined by the left gutter stiffer and the left inner side panel and by the right gutter stiffer and the right inner side panel, respectively.

9. The rear vehicle body structure according to claim 8, wherein the lower edge of the opening section is defined by the rear panel assembly, an upper edge of the opening section is defined by a rear roof rail extending in the vehicle width direction, the left and right side edges of the opening section are defined by the left and right gutter assemblies, the left and right gutter assemblies comprise the left and right inner side wall sections and the left and right gutter stiffeners, and the left and right gutter stiffeners comprise:
left and right lower gutter members extending from left and right lower corner sections between the rear panel assembly and the left and right gutter assemblies to the left and right inner side wall sections; and left and right upper gutter members extending from left and right upper corner sections between the rear roof rail and the left and right gutter assemblies to the left and right inner side wall sections.

10. The rear vehicle body structure according to claim 9, wherein the rear panel assembly is constructed in a closed sectional shape with a rear outer member disposed on the exterior side of the vehicle and extending in the vehicle width direction and a rear inner member disposed on an interior side of the vehicle and extending in the vehicle width direction, the rear inner member has left and right bulge sections bulging toward the interior of the vehicle, the rear outer member has a body section joined to vehicle-exterior-side surfaces of the left and right bulge sections, the left and right lower corner sections are each constructed in a closed sectional shape with a left or right inner corner member disposed on the interior side of the vehicle and having the left or right lower gutter member joined thereto and a left or right outer corner member disposed on the exterior side of the vehicle and joined to the left or right inner corner member, and the left and right outer corner members are disposed on portions of the left and right lower corner sections on the exterior side of the vehicle, the left and right outer corner members being joined to the body section and to corresponding ones of the left and right lower gutter members.

11. The rear vehicle body structure according to claim 10, wherein the rear outer member includes a rear outer panel constituting a vehicle-width-intermediate region, the rear inner member includes a rear inner panel constituting a vehicle-width-intermediate region, the left and right inner corner members each comprise:
a left or right rear panel extension extending outwardly, in the vehicle width direction, from the rear inner panel; and a left or right gutter extension joined at an upper end portion thereof to a vehicle-interior-side surface of the left or right lower gutter member and thereby constructing a closed section in conjunction with the left or right lower gutter member, and the left and right gutter extensions are joined at their respective lower end portions to the left and right rear panel extensions, respectively.

12. The rear vehicle body structure according to claim 11, wherein the left and right rear panel extensions are each formed of a plate greater in thickness than a plate of which each of the left and right gutter extensions is formed.

13. The rear vehicle body structure according to claim 10, wherein the left and right outer corner members each comprise a left or right combination panel disposed near the left or right lower corner section for accommodating a left or right rear combination lamp, and the left and right outer corner members are joined to the body section and to corresponding ones of the left and right lower gutter members.

14. The rear vehicle body structure according to claim 13, wherein the left and right combination panels each comprise a left or right inner combination member disposed on a peripheral edge of the opening section and a left or right side combination member disposed outwardly, in the vehicle width direction, of the left or right inner combination member, and the left and right inner combination members are each formed of a plate greater in thickness than a plate of which each of the left and right side combination members is formed.

15. The rear vehicle body structure according to claim 9, wherein the left and right upper gutter members are each formed of a plate greater in thickness than a plate of which each of the left and right lower gutter members is formed.

16. A rear vehicle body structure comprising: an opening section formed in a rear surface of a vehicle body; a rear panel assembly of a closed sectional shape disposed on and along a lower edge of the opening section and extending in a vehicle width direction; and left and right rear wheel houses disposed in front of the rear panel assembly and constituting parts of inner walls of left and right side sections of the vehicle body, the left and right rear wheel houses including support sections for supporting left and right rear suspension dampers, wherein the rear vehicle body structure further comprises left and right panel gussets interconnecting the rear panel assembly and the left and right rear wheel houses, and wherein the left and right panel gussets extend from their respective one end portions, connected to the left and right rear wheel houses, toward a rear of the vehicle body while slanting toward a vehicle width center, the left and right panel gussets being joined at their respective other end portions to the rear panel assembly, wherein the rear panel assembly is formed in a closed sectional shape with a rear outer member disposed on an exterior side of the vehicle and extending in the vehicle width direction and a rear inner member disposed on an interior side of the vehicle and extending in the vehicle width direction, the rear outer member includes a rear outer panel constituting a vehicle-width-intermediate region, the rear inner member includes a rear inner panel constituting a vehicle-width-intermediate region, the rear outer panel comprises a body section opposed to a rear surface of the rear inner panel, left and right bent sections bent from opposite end portions, in the vehicle width direction of the body section, toward a front of the vehicle body, and a plurality of bulkheads extending from the left and right bent sections toward the rear inner panel, a front end portion of each of the plurality of bulkheads is disposed outwardly, in the vehicle width direction, of the left and right bent sections, and an interior of the rear panel assembly is partitioned in the vehicle with direction by the plurality of bulkheads.

17. The rear vehicle body structure according to claim 16, wherein each of the plurality of bulkheads has a front flange extending from the front end portion outwardly in the vehicle width direction and joined to the rear inner member.

18. The rear vehicle body structure according to claim 17, wherein the rear inner panel has a polygonal section part formed in a channel configuration of a polygonal sectional shape hollowed toward the front of the vehicle body and extending in the vehicle width direction, the polygonal section part is closed with the body section and includes a front wall remotest from the body section in a forward direction of the vehicle body, an upper wall extending from an upper end of the front wall toward the rear of the vehicle body and a lower wall extending from the lower end of the front wall toward the rear of the vehicle body, and each of the plurality of bulkheads has: an upper end section formed to extend along the upper wall of the polygonal section part; an upper flange extending outwardly, in the vehicle width direction, from the upper end section and joined to the upper wall of the polygonal section part; a lower end section formed to extend along the lower wall of the polygonal section part; and a lower flange extending outwardly, in the vehicle width direction, from the lower end section and joined to the lower wall of the polygonal section part.

19. The rear vehicle body structure according to claim 18, wherein a body-side upper flange extending in the vehicle width direction is formed on an upper end of the body section, and an upper recess is formed between each of opposite ends, in the vehicle width direction, of the body-side upper flange and the upper flange of a corresponding one of the plurality of bulkheads.

20. The rear vehicle body structure according to claim 18, wherein a body-side lower flange extending in the vehicle width direction is formed on a lower end of the body section, and a lower recess is formed between each of opposite ends, in the vehicle width direction, of the body-side lower flange and the lower flange of a corresponding one of the plurality of bulkheads.

21. The rear vehicle body structure according to claim 16, wherein the rear inner panel includes a vertical plate-shaped extended wall section extending from the lower end of the polygonal section part along the rear surface of the vehicle body.

* * * * *